(12) United States Patent
Wurcker et al.

(10) Patent No.: US 10,581,588 B2
(45) Date of Patent: Mar. 3, 2020

(54) METHODS FOR PROTECTING SUBSTITUTION OPERATION USING SUBSTITUTION TABLE AGAINST A SIDE-CHANNEL ANALYSIS

(71) Applicant: ESHARD, Martillac (FR)

(72) Inventors: Antoine Wurcker, Villenave d'Ornon (FR); Christophe Clavier, Rilhac Lastours (FR)

(73) Assignee: ESHARD, Martillac (FR)

( * ) Notice: Subject to any disclaimer, the term of this patent is extended or adjusted under 35 U.S.C. 154(b) by 314 days.

(21) Appl. No.: 15/636,225

(22) Filed: Jun. 28, 2017

(65) Prior Publication Data
US 2017/0373838 A1     Dec. 28, 2017

(30) Foreign Application Priority Data

Jun. 28, 2016   (EP) ..................................... 16176716
Jun. 28, 2016   (EP) ..................................... 16176717
(Continued)

(51) Int. Cl.
*H04L 29/06*     (2006.01)
*H04L 9/00*      (2006.01)
(Continued)

(52) U.S. Cl.
CPC ................ *H04L 9/002* (2013.01); *G09C 1/00* (2013.01); *H04L 9/0631* (2013.01);
(Continued)

(58) Field of Classification Search
CPC ..... H04L 9/002; H04L 9/0631; H04L 9/0861; H04L 9/14
See application file for complete search history.

(56) References Cited

U.S. PATENT DOCUMENTS

| | | |
|---|---|---|
| 6,278,783 B1 | 8/2001 | Kocher et al. |
| 8,625,780 B2 | 1/2014 | Peter et al. |
| | (Continued) | |

FOREIGN PATENT DOCUMENTS

| | | |
|---|---|---|
| EP | 1267514 A2 | 12/2002 |
| EP | 1601132 A1 | 11/2005 |
| | (Continued) | |

OTHER PUBLICATIONS

Extended European Search Report from EP Appn. No. 16176714.0, dated Jan. 3, 2017, 6 pages.
(Continued)

*Primary Examiner* — Sher A Khan
(74) *Attorney, Agent, or Firm* — Brake Hughes Bellermann LLP

(57) ABSTRACT

A method for executing by a circuit a substitution operation such that an output data may be selected in a substitution table using an input data as an index. The substitution operation may be performed using a new masked substitution table. The input data may be combined by XOR operations with a new value of a first mask parameter, and the output data may be combined by XOR operations with a new value of a second mask parameter. The new masked substitution table may be generated by computing the new value of the first mask parameter by applying XOR operations to a previous value of the first mask parameter and to a first input mask, computing the new value of the second mask parameter by applying XOR operations to a previous value of the second mask parameter and to a second input mask, and generating the new masked substitution table using a previous masked substitution table and the first and second input masks.

23 Claims, 12 Drawing Sheets

(30) Foreign Application Priority Data

| | | | |
|---|---|---|---|
| Jun. 28, 2016 | (EP) | ..................................... | 16176718 |
| Jun. 28, 2016 | (EP) | ..................................... | 16176719 |
| Jun. 28, 2016 | (EP) | ..................................... | 16176721 |

(51) Int. Cl.
   *G09C 1/00* (2006.01)
   *H04L 9/06* (2006.01)
   *H04L 9/08* (2006.01)
   *H04L 9/14* (2006.01)

(52) U.S. Cl.
   CPC .............. *H04L 9/0861* (2013.01); *H04L 9/14* (2013.01); *H04L 2209/04* (2013.01); *H04L 2209/08* (2013.01); *H04L 2209/12* (2013.01)

(56) References Cited

U.S. PATENT DOCUMENTS

| | | | |
|---|---|---|---|
| 9,331,848 B1* | 5/2016 | Pedersen | H04L 9/003 |
| 2001/0053220 A1 | 12/2001 | Kocher et al. | |
| 2005/0259814 A1 | 11/2005 | Gebotys | |
| 2006/0056622 A1 | 3/2006 | Liardet et al. | |
| 2006/0140401 A1* | 6/2006 | Johnson | G06F 21/14 380/44 |
| 2006/0159257 A1* | 7/2006 | Fischer | H04L 9/003 380/28 |
| 2006/0256963 A1* | 11/2006 | Gebotys | H04L 9/003 380/205 |
| 2007/0076890 A1 | 4/2007 | Muresan et al. | |
| 2007/0160196 A1 | 7/2007 | Timmermans | |
| 2008/0019503 A1* | 1/2008 | Dupaquis | H04L 9/0625 380/28 |
| 2008/0240443 A1 | 10/2008 | Vuillaume et al. | |
| 2008/0260145 A1* | 10/2008 | Trichina | H04L 9/003 380/46 |
| 2008/0285743 A1* | 11/2008 | Yokota | H04L 9/003 380/28 |
| 2008/0285745 A1* | 11/2008 | Teglia | H04L 9/003 380/29 |
| 2009/0074181 A1 | 3/2009 | Pelletier | |
| 2009/0086976 A1* | 4/2009 | Scian | H04L 9/003 380/277 |
| 2011/0013769 A1* | 1/2011 | Itoh | H04L 9/003 380/28 |
| 2012/0250854 A1 | 10/2012 | Danger et al. | |
| 2014/0351603 A1 | 11/2014 | Feix et al. | |
| 2015/0169904 A1 | 6/2015 | Leiserson et al. | |
| 2016/0065368 A1* | 3/2016 | Hars | G06F 21/78 713/190 |
| 2016/0119124 A1* | 4/2016 | Shay | G06F 12/0875 380/28 |
| 2016/0127123 A1* | 5/2016 | Johnson | H04L 9/003 713/189 |
| 2016/0269175 A1 | 9/2016 | Cammarota et al. | |
| 2017/0063524 A1* | 3/2017 | Bruneau | H04L 9/005 |
| 2017/0085540 A1* | 3/2017 | Avanzi | H04L 63/061 |
| 2017/0104586 A1 | 4/2017 | Hars | |
| 2017/0244552 A1 | 8/2017 | Thiebeauld De La Crouee et al. | |
| 2017/0373829 A1 | 12/2017 | Wurcker et al. | |
| 2017/0373832 A1 | 12/2017 | Wurcker et al. | |
| 2017/0373838 A1 | 12/2017 | Wurcker et al. | |

FOREIGN PATENT DOCUMENTS

| | | | |
|---|---|---|---|
| EP | 2363974 A1 * | 9/2011 | ............. H04L 9/003 |
| GB | 2443355 A | 4/2008 | |
| WO | 0108012 A1 | 2/2001 | |

OTHER PUBLICATIONS

Extended European Search Report from EP Appn. No. 16176717.3, dated Jan. 3, 2017, 6 pages.
Extended European Search Report from EP Appn No. 16176721.5, dated Jan. 3, 2017, 7 pages.
Extended European Search Report from EP Appn. No. 16176716.5, dated Jan. 3, 2017, 7 pages.
Extended European Search Report from EP Appn No. 16176719.9, dated Jan. 5, 2017, 8 pages.
Extended European Search Report from EP Appn. No. 16176718.1, dated Dec. 22, 2016, 9 pages.
Bruneau, Nicolas, et al., "Multi-Variate Higher-Order Attacks of Shuffled Tables Recomputation", http:// eprint.iacr.org/2015/837.pdf, retrieved May 9, 2016, 20 pages.
Coron, Jean-Sebastien, "Higher Order Masking of Look-up Tables", International Association for Cryptologic Research, vol. 2014025:092212, Feb. 5, 2014, 22 pages.
Herbst, Christoph, et al., "An AES Smart Card Implementation Resistant to Power Analysis Attacks", Applied Cryptography and Network Security Lecture Notes in Computer Science; LNCS, Jan. 1, 2006, 14 pages.
Itoh, Kouichi, et al., "DPA Countermeansure Based on the "Masking Method"", ICICS 2001, LNCS 2288, 2002, pp. 440-456.

* cited by examiner

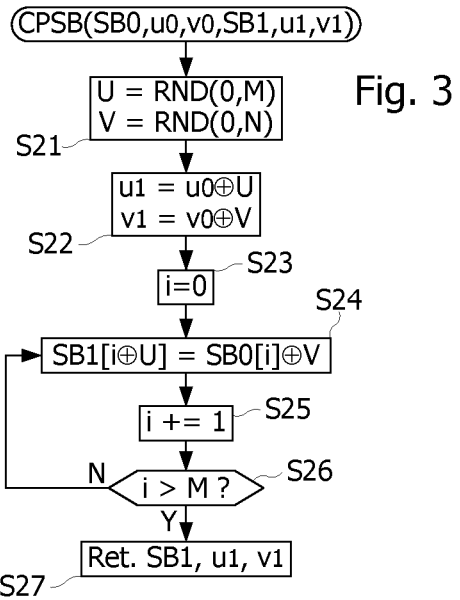
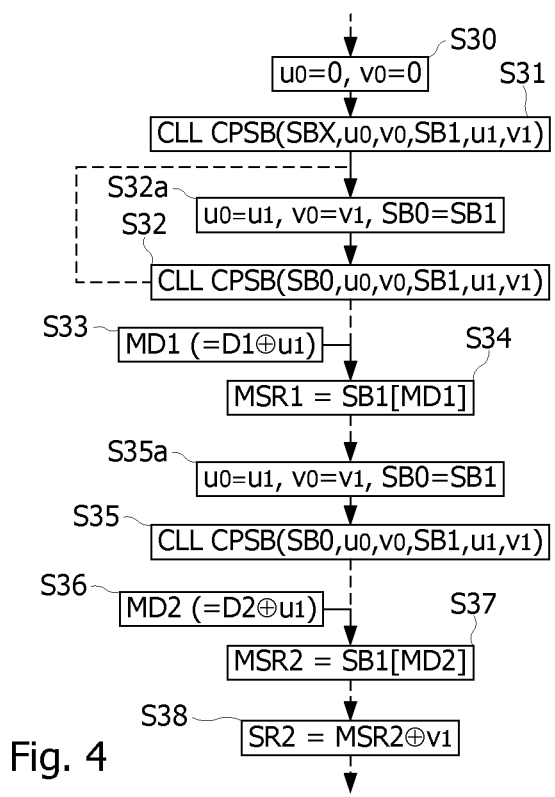
Fig. 3
Fig. 4

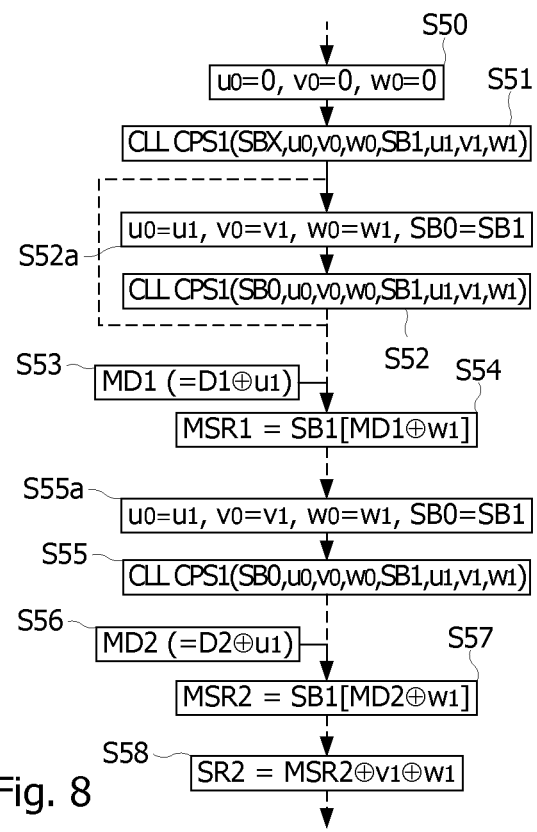

CPS2(SB0,u0,v0,w0,z0,SB1,u1,v1,w1,z1)

S61: U = RND(0,M)
V = RND(0,N)
W = RND(0,Mx(M,N))
Z = RND(0,Mx(M,N))

S62: u1 = u0⊕W⊕U
v1 = v0⊕W⊕V
w1 = w0⊕W⊕Z
z1 = z0⊕Z

S63: i=0

S64: SB1[i⊕U] = SB0[i]⊕V

S65: i += 1

S66: i > M ?  N → back; Y ↓

S67: Ret. SB1,u1,v1,w1,z1

CLL CPS2(SBX,u0,v0,w0,z0,SB1,u1,v1,w1,z1)

S72a: u0=u1,v0=v1,w0=w1,z0=z1, SB0=SB1

CLL CPS2(SB0,u0,v0,w0,z0,SB1,u1,v1,w1,z1)

S72

S73: MD1 (=D1⊕u1)

S74: MSR1 = SB1[MD1⊕w1⊕z1]

S75a: u0=u1,v0=v1,w0=w1,z0=z1, SB0=SB1

S75: CLL CPS2(SB0,u0,v0,w0,z0,SB1,u1,v1,w1,z1)

S76: MD2 (=D2⊕u1)

S77: MSR2 = SB1[MD2⊕w1⊕z1]

S78: SR2 = MSR2⊕v1⊕w1⊕z1

Fig. 10

METHODS FOR PROTECTING SUBSTITUTION OPERATION USING SUBSTITUTION TABLE AGAINST A SIDE-CHANNEL ANALYSIS

CROSS REFERENCE TO RELATED APPLICATIONS

This application claims priority to European Application Numbers, EP16176716.5, EP16176717.3, EP16176718.1, EP16176719.9, EP16176721.5, each filed Jun. 28, 2016, the disclosures of which are incorporated herein by reference.

TECHNICAL FIELD

The present disclosure relates to methods and devices for protecting a circuit or a program against side channel analyses and provide value of a secret data handled by the circuit or program, and in particular a circuit for transforming a message by an encryption or decryption algorithm using a secret key.

The present disclosure also relates to devices implementing a cryptographic algorithm, such as secure devices (smart card integrated circuits), hardware cryptographic components integrated onto mother boards of computers and other electronic and IT equipment (USB drives, TV decoders, game consoles, etc.), or the like.

The present disclosure also relates to circuits implementing a cryptographic algorithm such as AES (Advanced Encryption Standard). The present disclosure also relates to a program implementing such an algorithm, provided for being executed in a secure or non-secured environment.

The present disclosure also relates to circuits and software implementing a substitution operation using an input data as an index to select an output data in a substitution table.

BACKGROUND

Circuits implementing cryptographic algorithms can comprise a central processing unit (CPU), and a circuit dedicated to cryptographic computing, for example a cryptographic coprocessor. These circuits may include thousands of logic gates that switch differently according to the operations executed. These switching operations create short variations in current consumption, for example of a few nanoseconds, and those variations can be measured. In particular, CMOS-type integrated circuits comprise logic gates that only consume current when they switch, i.e., when a logic node changes its state to 1 or to 0. Therefore, the current consumption depends on data handled by the central processing unit and on its various peripherals: memory, data flowing on the data or address bus, cryptographic coprocessor, etc.

Furthermore, certain software programs using encryption or obfuscation techniques, such as the White-box Cryptography technique, may integrate secret data in such a way that it is very difficult to determine data by reverse engineering. Certain software programs may also receive a secret data from outside through a secure communication channel.

Such circuits may be subjected to so-called side channel analysis attacks based on observing current consumption, magnetic or electromagnetic radiation. Such attacks provide secret data, in particular encryption keys. The most frequent side channel attacks implement statistical analysis methods such as SPA ("Single Power Analysis"), DPA ("Differential Power Analysis"), CPA ("Correlation Power Analysis") or EMA ("ElectroMagnetic Analysis"). SPA analysis normally only requires the acquisition of a single current consumption trace. SPA analysis provides information about the activity of the integrated circuit by observing part of the current consumption trace corresponding to a cryptographic computation, since the current consumption trace varies according to operations executed and data handled. Software may also undergo such side channel attacks during its execution by a circuit.

DPA and CPA analyses enable the key of an encryption algorithm to be found by acquiring numerous circuit consumption traces and by statistically analyzing these traces to find the target information. DPA and CPA analyses can be based on the premise that the consumption of a CMOS-type integrated circuit varies when a bit changes from 0 to 1 in a register or on a bus, and does not vary when a bit remains equal to 0, remains equal to 1 or changes from 1 to 0 (discharge of a stray capacitance of a MOS transistor). Alternatively, the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used in order to develop a consumption model that does not require knowledge of the structure of the integrated circuit in order to be applicable. DPA analysis involves amplifying this consumption difference using statistical processing on numerous current consumption traces, aiming to highlight a measurement difference between two types of consumption traces distinguished according to formulated hypotheses.

CPA analysis is based on a linear current consumption model and involves computing a correlation coefficient between, firstly, the consumption points measured that form the captured consumption traces and, secondly, an estimated consumption value, computed from the linear consumption model and a hypothesis on data to be discovered that is handled by the microcircuit and on the value of the encryption key.

Electromagnetic analysis (EMA) is based on the principle that an integrated circuit may send information in the form of near or far field electromagnetic radiation. Given that transistors and the wires connecting the transistors emit electromagnetic signals when their state changes, these signals can be treated like the current consumption variation signals by an analysis such as one of SPA, DPA and CPA analyses. Other side channel analyses exist, such as "Template analysis" and "Mutual Information Analysis" (MIA). All of the above-mentioned analyses are based on a time alignment of all the analyzed traces. In other words, all the measurements performed at a given time, e.g., from the time the execution of a command is activated by the circuit, must correspond to the same data handled by the algorithm.

SUMMARY

In one general aspect, a method for executing by a circuit a substitution operation such that an output data may be selected in a substitution table using an input data as an index may include using a new masked substitution table, the input data being combined by Exclusive OR (XOR) operations with a new value of a first mask parameter, and the output data being combined by XOR operations with a new value of a second mask parameter, the new masked substitution table being generated by: selecting a first and a second input mask, computing the new value of the first mask parameter by applying XOR operations to a previous value of the first mask parameter and to the first input mask, computing the new value of the second mask parameter by applying XOR operations to a previous value of the second mask parameter and to the second input mask; selecting each value in a previous masked substitution table, and for each selected value: computing a masked value by applying XOR operations to the selected value and to the second input mask, computing a masked index by applying XOR operations to the first mask and to an original index, and storing the masked value in the new masked substitution table, the selected value being selected at the original index and the masked value being stored at the masked index, or the selected value being selected at the masked index and the masked value being stored at the original index.

Implementations can include one or more of the following features. For example, the new masked substitution table may be generated by selecting an input masks for each of ranks from 1 to n, n being an integer number greater than zero, for each rank j from 1 to n−1, computing a new value of a mask parameter of rank j by applying XOR operations to the previous value of the mask parameter of rank j and to the input masks of ranks j and j+1, and computing a new value of a mask parameter of rank n by applying XOR operations to a previous value of the mask parameter of rank n and to the input mask of rank n, the new value of the first mask parameter being computed by applying XOR operations to the previous value of the first mask parameter, to the input mask of rank one and to first input mask, the new value of the second mask parameter being computed by applying XOR operations to the previous value of the second mask parameter, to the input mask of rank one and to the second input mask, the substitution operation including applying XOR operations to the masked input data and to each of the mask parameters of ranks one to n, the masked output data corresponding to the output data of the substitution operation, combined by XOR operations with the second mask parameter and with each of the mask parameters of ranks one to n.

In some implementations, the new masked substitution table may be generated by selecting first and second input masks, of ranks 1 to n, n being an integer number greater than zero, for each rank j from 1 to n−1, computing a new value of a first mask parameter of rank j by applying XOR operations to the previous value of the first mask parameter of rank j and to the first input masks of ranks j and j+1, and computing a new value of a second mask parameter of rank j by applying XOR operations to the previous value of second first mask parameter of rank j and to the second input masks of ranks j and j+1; computing a new value of a first mask parameter of rank n by applying XOR operations to a previous value of the first mask parameter of rank n and to the first input mask of rank n; computing a new value of a second mask parameter of rank n by applying XOR operations to a previous value of the second mask parameter of rank n and to the second input mask of rank n, and the new value of the first mask parameter being obtained by applying XOR operations to the previous value of the first mask parameter, to the first input mask of rank one and to first input mask, the new value of the second mask parameter being obtained by applying XOR operations to the previous value of the second mask parameter, to the second input mask of rank one and to the second input mask, the substitution operation including applying XOR operations to the masked input data and to the each of the first mask parameter of ranks one to n, the masked output data corresponding to the output data of the substitution operation, combined by XOR operations with the second mask parameter and with each of the second mask parameters of ranks one to n.

In some implementations, the input masks may be randomly selected. The data in the masked substitution table may be computed in a random order.

In some implementations, the cryptographic algorithm conforms with the Advanced Encryption Standard (AES). The method may include computing a masked input data by applying XOR operations to the input data and to the new value of the first mask parameter, computing a first masked round input data by applying XOR operations to the masked input data and to a first round key, performing several rounds, each including performing a substitution operation applied to a previously computed masked round input data and using the new masked substitution table, computing a masked round input data by applying XOR operations to an output data of an AES column-based permutation operation, to a corresponding round key, and to the new values of the first mask parameter and the second mask parameter, and performing a last round including: computing a substitution output data by performing a substitution operation using the new masked substitution table, receiving as input a previously computed masked round input data, and computing a masked output data by applying XOR operations to the masked substitution output data and to a corresponding round key, an output data resulting from processing the input data by the cryptographic algorithm being obtained by applying XOR operations to the masked output data and to the new value of the second mask parameter.

In some implementations, the round keys may be masked round keys. The method may include selecting a third input mask, and computing a new value of a third mask parameter by applying XOR operations to a previous value of the third mask parameter and to the third input mask, the new value of the first mask parameter being computed by applying XOR operations to the previous value of the first mask parameter and to the third and first input masks, the new value of the second mask parameter being computed by applying XOR operations to the previous value of the second mask parameter and to the third and second input masks, new masked round keys being each obtained by applying XOR operations to the new value of the third mask parameter and to a previous round key, the new masked substitution table being generated by using the new values of the first and second mask parameters, the substitution operation including applying XOR operations to the masked input data and to the new value of the third mask parameter, the masked output data corresponding to the output data of the substitution operation, combined by XOR operations with the second mask parameter and with the new value of the third mask parameter.

In some implementations, the cryptographic algorithm conforms with the Data Encryption Standard (DES). The method may include performing several rounds, each including: computing a masked round data by applying XOR operations to an output data of a DES expansion operation and to the new value of the first mask parameter, performing a substitution operation from the masked round data using new masked substitution tables, the substitution operation providing a masked substitution output data masked by the new value of the second mask parameter, and computing an unmasked substitution output data by applying XOR operations to the masked substitution output data and to the new value of the second parameter.

In some implementations, the generation of the new masked substitution tables includes: selecting a third and a fourth input mask, and computing a new value of a third mask parameter by applying XOR operations to a previous value of the third mask parameter and to the third input mask, the new value of the first mask parameter being computed by applying XOR operations to previous value of the first mask parameter and to the third and first input masks, computing new values of a fourth mask parameter by applying XOR operations to a previous value of the fourth mask parameter and to the fourth input mask, the new value of the second mask parameter being computed by applying XOR operations to the previous value of the second mask parameter and to the fourth and second input masks, computing a transformed first input mask by applying to the first input mask the DES expansion operation, and computing a transformed second input mask by applying a reverse DES permutation operation to the second input mask, the new masked substitution tables being generated using as the first and second input masks the transformed first and second input masks, the method including using masked round keys obtained by applying XOR operations to DES round keys and to transformed third and fourth input masks obtained by applying the DES expansion operation to third and fourth input masks, and using the new values of third and fourth mask parameters.

BRIEF DESCRIPTION OF THE DRAWINGS

The method and/or device may be better understood with reference to the following drawings and description. Non-limiting and non-exhaustive descriptions are described with the following drawings. In the figures, like referenced signs may refer to like parts throughout the different figures unless otherwise specified.

FIG. 3 illustrates protection steps according to an example embodiment;

FIG. 4 illustrates protection steps according to another example embodiment;

FIG. 7 illustrates protection steps, according to an example embodiment;

FIG. 8 illustrates protection steps, according to another example embodiment;

FIG. 9 illustrates protection steps, according to another example embodiment;

FIG. 10 illustrates protection steps, according to another example embodiment;

DETAILED DESCRIPTION

Figure 1:
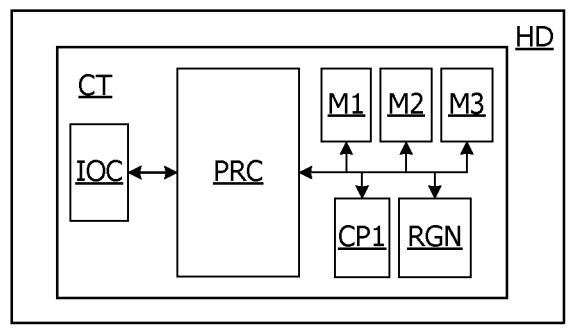
FIG. 1 illustrates a conventional architecture of a secure circuit.

In view of the drawbacks and considerations noted above, it may be desirable to protect an integrated circuit or a software program against one or more of side channel analyses. It may also be desirable in particular to protect substitution operations using a substitution table performed in a cryptographic algorithm such as AES.

In some implementations, the input and output data and the substitution table may be required to be kept hidden. Such a substitution operation is implemented in several cryptographic algorithms, such as AES (Advanced Encryption Standard), DES (Data Encryption Standard), Triple DES, TwoFish, PRIDE, ARIA and/or SEED.

Circuits against side channel analysis may be described in French Patent application no. FR16 51443 filed on Feb. 22, 2016 by Applicant, which discloses a method for analyzing traces representative of the activity of a circuit when the latter executes an operation successively on different input data. This method may include extracting a part of each trace, and generating a histogram from each extracted trace part, by counting an occurrence number of each possible value appearing in each of the extracted parts of these traces. Partial results of the operation may then be computed by applying the operation to each input data and each possible value of a part of a secret key involved in the operation. The method may then identify for each possible part value of the secret key, all the input data which provide the same partial result. For each possible part value of the secret key, the occurrence numbers in the histograms, corresponding to the identified input data and the part value of the secret key may then be added. The part of the secret key can be determined by subjecting the added occurrence numbers to a statistical analysis. The statistical analysis may assume that if a value related to the secret key has leaked in the extracted parts of the traces, it can be highlighted by the added occurrence numbers.

Example embodiments relate to a method for encrypting or decrypting an input data according to a cryptographic algorithm including a substitution operation. The substitution operation may be performed according to methods described herein.

Example embodiments also relate to a circuit including a processor and configured to implement the above-defined methods. The circuit may include a co-processor.

Example embodiments also relate to a circuit arranged on a medium, such as, for example, a plastic card.

Embodiments also relate to a computer program product directly loadable into an internal memory of a computer and including code portions which when executed by a computer configure the computer to carry out the steps of the above-defined methods.

As described herein, "word" designates a group of bits in a data, and "word column" designates a subset in a data set including a single word from all data in the data set, all the words in the word column having the same size. The words forming a word column are not necessary aligned, i.e., do not necessary includes the same bit positions in the data of the data set.

FIG. 1 illustrates a secure integrated circuit CT arranged on a portable medium HD, such as a plastic card or any other medium, or in a terminal, such as a mobile terminal. The integrated circuit CT may include a microprocessor PRC, an input/output circuit IOC, memories M1, M2, M3 coupled to the microprocessor by a data and address bus and, optionally, a cryptographic computation coprocessor CP1 or arithmetic accelerator, and/or a random number generator RGN. The memories M1, M2, M3 can include a volatile memory M1, for example a RAM-type ("Random Access Memory") memory containing volatile application data, a non-volatile memory M2, for example an EEPROM or Flash memory, containing non-volatile data and application programs, and possibly a read-only memory (or ROM memory) containing the operating system of the microprocessor. The operating system can be also stored in the non-volatile memory.

The communication interface circuit IOC may be of contact type, for example according to the ISO/IEC 7816 standard, of contactless type with inductive coupling, for example according to the ISO/IEC 14443A/B or ISO/IEC 13693 standard, of contactless type by electrical coupling (UHF interface circuit), or of both contact and contactless type. The interface circuit IOC may also be coupled through a specific interface, to another circuit such as an NFC (Near-Field Communications) controller, or a main circuit of a terminal such as a mobile terminal or a connected object.

In some implementations, the integrated circuit CT may be configured to execute operations of encrypting, decrypting and/or signing messages that may be sent to the integrated circuit CT using a cryptographic function. This cryptographic function and/or operation may be executed by the microprocessor PRC of the circuit CT or partially or totally carried out by the microprocessor PRC to the coprocessor CP1.

Example embodiments as described herein propose protection methods for an operation using a substitution table or a lookup table, e.g., in a cryptographic algorithm, implemented in a circuit such as the circuit CT, against side channel analyses. Accordingly, the operation may receive an input data, and may provide an output data read in the table using the input data as an index. A protection of this operation according to conventional art consists in masking the substitution table using the property:

$$SBM[D \oplus U] = SB[D] \oplus V, \quad (1)$$

where SB is the substitution table, SBM is the masked substitution table, and U and V are input masks.

Figure 2:
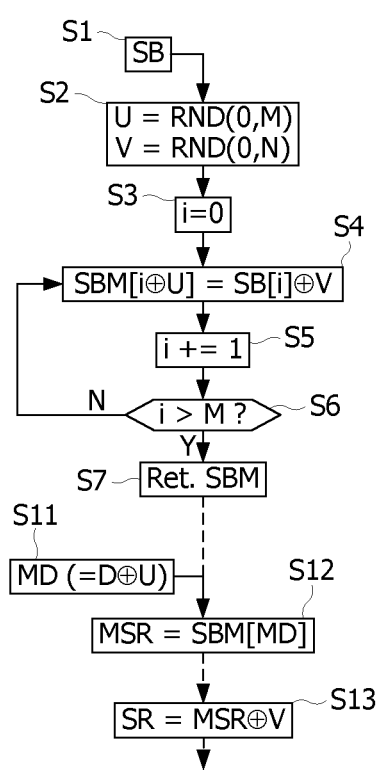
FIG. 2 illustrates steps of an operation, including protection steps according to a conventional art.
Figure 2A:
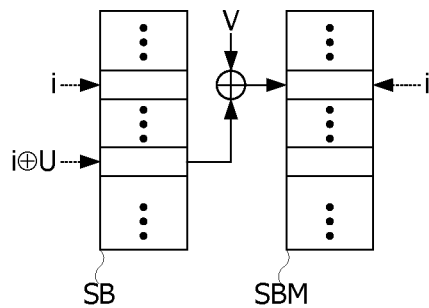
FIG. 2A illustrates a table transformed by the steps of FIG. 2.

FIG. 2 illustrates steps (operations, functions, processes, etc.) S1 to S7 generating the masked substitution table SBM, and steps S11 to S13 using the masked substitution table in a substitution operation. FIG. 2A illustrates the substitution table SB and the masked substitution table SBM derived from the substitution table SB by executing steps S1 to S7. At step S1, the substitution table SB may be input. At step S2, the masks U, V may be randomly determined between 0 and maximum values M and N. The value M may correspond with the amount of data in the substitution table SB minus one, and the value N may correspond with the maximum value of the data in the table SB. In some implementations, the values M and N may not be necessary the same.

At step S3, an index i may be initialized to zero (0). At step S4, the index i may be used to select an output data SB[i] in the substitution table SB and the selected output data SB[i] may be masked by combining it with the mask V by an XOR operation. The result of the XOR operation SB[i]⊕V may be stored in the masked substitution table SBM at an index i⊕U resulting from the combination by an XOR operation of the index i with the mask U. At step S5, the index i may be incremented by one (1). At step S6, the index i may be compared with the value M. If the index i is greater than the value M, step S7 may be executed; otherwise steps S4 to S6 may be executed again for a new iteration. At step S7, the masked substitution table SBM may be completely defined and provided as output of steps S1 to S7.

In step S11, a masked data MD may be used to select an output data SR in the substitution table SB. To that end, the masked data MD may result from masking a data D by applying to it an XOR operation with the input mask U. At step S12, the masked data MD may be used as an index to select a masked output data MSR in the masked substitution table SBM. At step S13, executed when needed, the masked output data MSR may be combined with the mask V by an XOR operation, thereby providing the unmasked output data SR.

As a result, such a masking protection of a substitution table is not resistant to the previously mentioned analyses combining leakage of the masked data MD and leakage of the input mask U. The masked substitution table computation is more particularly sensitive to such analyses as the masks U and V are to be used many times (M times).

FIG. 3 illustrates steps (operations, functions, processes, etc.) S21 to S27 of a procedure CPSB generating a masked substitution table SB1 from another substitution table SB0, according to an example embodiment. The procedure CPSB may receive the substitution table SB0 to be masked and mask parameters u0, v0 and may provide a masked substitution table SB1, and updated mask parameters u1, v1. At step S21, input masks U, V are determined between 0 and a maximum value M, N. The maximum value M of the input mask U may correspond with the amount of data in the substitution table SB0 minus one, and the maximum value N of the input mask V may correspond with the maximum value of the data in the table SB0. The masks U, V can be chosen randomly. At step S22, the mask parameters u1, v1 may be computed using the input masks U, V and the previous value of the mask parameters u0, v0, as follows:

$$u1 = u0 \oplus U$$

$$v1 = v0 \oplus V \quad (2)$$

It results from the equation (2) that the parameter u may be updated by being masked by the mask U, and the parameter v may be updated by being masked by the mask V.

At step S23, an index i may be initialized to zero (0). At step S24, the index i may be used to select an output data SB0[i] in the substitution table SB0 and the selected output data SB0[i] is masked by combining it with the mask V by an XOR operation. The result of the XOR operation SB0[i]⊕V may be stored in the masked substitution table SB1 at an index i⊕U resulting from the combination by an XOR operation of the index i with the input mask U:

$$SB1[i \oplus U] = SB0[i] \oplus V. \quad (3)$$

At step S25, the index i may be incremented by one (1). At step S26, the index i may be compared with the value M. If the index i is greater than the value M, step S27 may be executed; otherwise steps S24 to S26 may be executed again for a new iteration. At step S27, the masked substitution table SB1 may be completely defined and provided as output of the procedure CPSB with the updated parameters u and v.

It is noted that the masked table computed at step S24 can be obtained by several others ways, examples of which are defined in the following equations examples:

$$SB1[i]=SB0[i \oplus U] \oplus V. \quad (4)$$

$$SB1[pr[i] \oplus U]=SB0[pr[i]] \oplus V. \quad (5)$$

$$SB1[pr[i]]=SB0[pr[i] \oplus U] \oplus V. \quad (6)$$

where pr[i] represents a permutation over the set of integer numbers $\{0, \ldots, M\}$. In addition the permutation pr can be randomly generated, for example each time the masked substitution table SB1 is computed from a previous table SB0. Thus the permutation pr enables the elements of the masked substitution table SB1 to be computed in a random order.

FIG. 4 illustrates (operations, functions, processes, etc.) steps S30 to S38 of a procedure using a substitution table SBX, according to an example embodiment. This procedure may include initialization steps S30 to S32. At step S30, the mask parameters u0 and v0, may be initialized to zero (0). At step S31, the procedure CPSB may be called using as parameters the substitution table SBX, the mask parameters u0, v0, u1, v1 and a table SB1 resulting from masking the table SBX. Thus after step S31, $$u<1>=U<1>,$$

$$v<1>=V<1>, \text{ and}$$

$$SB1<1>[i \oplus U<1>]=SBX[i] \oplus V<1> \quad (7)$$

with "X<t>" refers to the value of a parameter X at an iteration t.

At step S32, the procedure CPSB may be called again one or more times, using as parameters:
the masked substitution table SB1 provided by the previous call to the procedure CPSB, and
the mask parameters u1, v1 computed by the previous call to the procedure CPSB.

The substitution table SB1 may be intended to receive the masked result of the substitution table SB1. A previous step S32a can set the parameters u0 and v0 respectively to u1 and v1 and the masked substitution table SB0 to the masked substitution table SB1, provided by the previous call to the procedure CPSB at step S31 or S32. A single active masked substitution table SB1 and corresponding mask parameters u1, v1 can be stored in a non-volatile memory of the circuit CT.

After the second call of the procedure CPSB at step S32, the parameters u1 and v1 and the masked substitution table SB1 are computed as follows:

$$u<2>=u<1> \oplus U<2>,$$

$$v<2>=v<1> \oplus V<2>, \text{ and}$$

$$SB1<2>[i \oplus U<2>]=SB1<1>[i] \oplus V<2>. \quad (8)$$

After step S32, when the procedure CPSB is called t−1 times, the parameters u and v have the following values:

$$u<t>=u<t-1> \oplus U<t>, \text{ and}$$

$$v<t>=v<t-1> \oplus V<t>. \quad (9)$$

In addition, a current masked substitution table SB1<t> is computed from a previous masked substitution table SB1<t−1> as follows:

$$SB1<t>[i \oplus U<t>]=SB1<t-1>[i] \oplus V<t>. \quad (10)$$

At step S33, one masked input data MD1 may be processed by an algorithm using the substitution table SBX. The input data MD1 may be masked by combining it with the last updated value u<t> (=u1) of the parameter u by an XOR operation. At step S34, an output masked data MSR1 may be selected in the masked substitution table SB1 using the data MD1 as index.

At step S35, the procedure CPSB may again be called for updating the masked substitution table SB1 and the parameters u1 and v1. Such an update is for example performed between two successive readings of the substitution table SB1 or between two successive encryptions or decryptions of a message. A previous step S35a can set the parameters u0 and v0, respectively, to u1 and v1 and the masked substitution table SB0 to the masked substitution table SB1, provided by the previous call to the procedure CPSB at step S32. At step S36, a new masked data MD2 (equal to a non-masked data D2 combined by an XOR operation with the last updated parameter u1) may be input to perform a substitution operation of the data D2 using the substitution table SBX. The masked data MD2 can also be computed from a previous value of this data combined with the last input mask U:

$$MD2<t>=MD2<t-1> \oplus U. \quad (11)$$

To perform the substitution operation, the masked data MD2 may be used as index to select a masked substituted data in the masked substitution table SB1 (step S37). The substitution operation may provide a masked data MSR2. At step S38, the masked data MSR2 can be unmasked to obtain an unmasked data SR2 (=MSR2⊕v1) by combining the masked data MSR2 with the parameter v1 by an XOR operation.

Therefore, the computations including the substitution operation are protected as soon as the mask parameter u is combined with a data to be processed, until the mask parameter v is combined with a resulting data.

The above-described methods can be applied to any encryption or decryption algorithm using a substitution box, such as AES, DES, Triple DES, TwoFish, PRIDE, ARIA and SEED.

Figure 5:
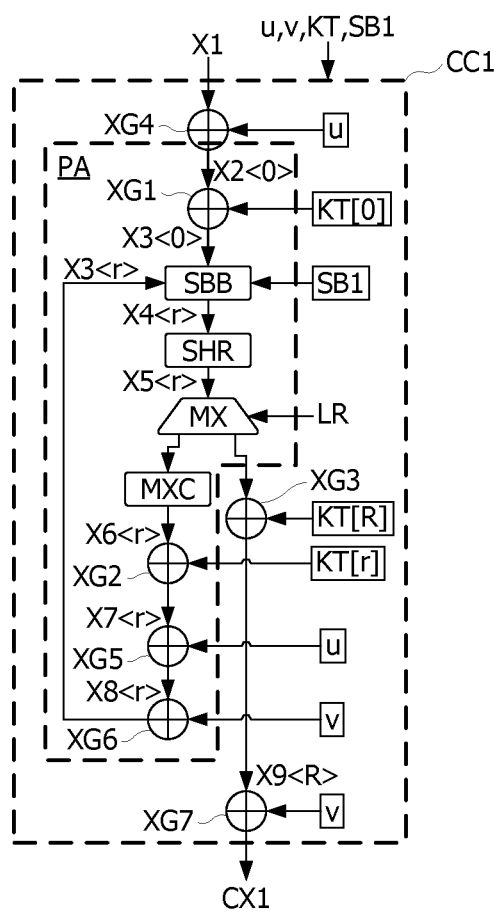
FIG. 5 is a block diagram of AES encryption algorithm including protection steps according to an example embodiment.

FIG. 5 illustrates a cryptographic calculation circuit CC1 implementing the AES algorithm for encrypting a data in accordance to an example embodiment. For further details about AES algorithm, the document "Advanced Encryption Standard FIPS PUB 197" published on 26 Nov. 2001 can be referred to. In FIG. 5, the cryptographic calculation circuit CC1 may receive a data X1 to be processed and may supply a resultant data CX1. The circuit CC1 also may receive a round key table KT containing all round keys derived from a secret key according to AES algorithm. The round keys in the table KT may have the same size as the data to be encrypted or decrypted by one execution of the AES algorithm, e.g., 128 bits (=16 bytes) for AES. The circuit CC1 may include circuits XG1, XG2, XG3 which may perform XOR operations with round keys, a substitute calculation circuit SBB, a row-based circular permutation calculation circuit SHR, a multiplexer MX, and/or a column-based permutation calculation circuit MXC. The circuits SBB, SHR, and MXC may be compliant with AES algorithm. The circuit XG1 may receive both the data X1 to be encrypted and a derived key KT[0] at an index 0 in the round key table KT supplied to the circuit CC1. The output data X2<0> of the circuit XG1 may be processed by the circuits SBB and SHR. The output of the circuit SHR may be transmitted by the multiplexer MX to the circuit MXC at rounds 0 to R−1 of the AES algorithm. At a last round R, the output of the circuit SHR may be transmitted to the circuit XG3 receiving at another input a last derived key KT[R] at an index R in the round key table KT. At the rounds 0 to R−1, the output of the circuit MXC may be processed by the circuit XG2 receiving a derived key KT[j] (j=1, . . . , R−1) read in the table KT. The output of the circuit XG2 may be processed by the circuits SBB and SHR. When a certain number (R−1) of calculation rounds are performed (10, 12 or 14, in accordance with the AES) by the chain including the circuits SBB, SHR, MXC, XG2, the multiplexer MX may be actuated to provide the output of the circuit SHR to the input of the circuit XG3 which ma y provide the output data CX1.

During a first calculation round, the data X1 may be processed by the circuit XG1 which may be added to the first derived key KT[0] by an XOR operation. The circuit XG1 may provide the resulting data $X1 \oplus K[0]$ which may be processed successively by the circuits SBB, SHR, MXC and XG2. Then the circuit XG2 may combine the data provided by the circuit MXC with a derived key KT[j] (j=1, . . . , R−1). The circuits SBB, SHR, MXC and XG2 may be successively activated for several rounds of the AES algorithm. The circuits SBB, SHR and XG3 may be activated at a last round R of AES algorithm. At each round j, a round key KT[j] (j=1, . . . , R−1) is read in the table KT.

The substitute calculation circuit SBB may generally be implemented using a substitution table SBX receiving an input data used as an index to select an output data in the substitution table. The substitution table SBX may include 256 bytes, and each byte of the data to be processed by the circuit SBB may be used as an index to select a byte in the table SBX. The permutation calculation circuit SHR can be implemented by a specific circuit.

In some implementations, the circuit CC1 may include circuits XG4, XG5, XG6 and XG7 which may perform XOR operations with the mask parameters u, u, v and v, respectively. Each of the circuit XG4 to XG7 may receive one of the mask parameters u, v, having the size of one word (e.g., one byte), and an input data of several words of the size of the mask parameter (16 bytes), and may perform an XOR operation with the mask parameter u for each word of the size of the mask parameter included in the input data. The circuit XG4 may receive the input data X1 and the mask parameter u, and may provide to the circuit XG2 a masked input data $X2<0>(=X1 \oplus u)$, $X1 \oplus u$ representing the masked data $X1 \oplus u//u// \ldots //u$, where "/" represents a concatenation operation of bit strings, $u//u// \ldots //u$ having the size of the data X1. The circuit XG5 may be interposed between circuits XG2 and XG6. The circuit XG5 may receive at another input the mask parameter u. The circuit XG6 may be connected to the output of the circuit XG5 and may receive at another input the parameter v. The circuit XG7 may be connected at the output of the circuit XG3 and may receive at another input the parameter v.

Before the circuit CC1 processes the input data X1, steps S30 to S32 of FIG. 4 are carried out to generate a substitution table SB1 and to get corresponding mask parameters u and v, which are provided to the circuit CC1 with the input data X1, and with a round key table KT. The circuit XG2 may add the data X2<0> to a first round key KT[0] read in the table KT. The circuit XG2 may provide to the input of the circuit SBB the data $X3<0> = X2<0> \oplus KT[0]$ $(=X2<0> \oplus u = X1 \oplus KT[0] \oplus u)$. Thus, the expected data $X1 \oplus KT[0]$ to be normally provided to the circuit SBB may be masked by the masked parameter u. The circuit SBB which may be implemented using the masked substitution table SB1 provides the data:

$$X4<0>=SB1[X1 \oplus KT[0] \oplus u]=SBX[X1 \oplus KT[0]] \oplus v. \quad (12)$$

Thus, the expected data $SBX[X1 \oplus K<0>]$ normally provided by the circuit SBB at the first round may be masked by the masked parameter v. The circuits SHR and MXC may provide expected result data X5<0> and X6<0>, respectively, still masked by the masked parameter v. The circuit XG2 may add to the masked value X6<0>, the second round key KT[1]. Thus, the circuit XG2 may provide the data X7<1> to the circuit XG5. The circuit XG5 may combine the data X7<1> with the mask parameter u and may provide the data $X8<1>(=X7<1> \oplus v \oplus u)$ to the circuit XG6. The data X8<1> may be unmasked by the circuit XG6, using the mask parameter v. Thus, at the output of the circuit XG6, the data X2<1> may only be masked by the mask parameter u, which may be ready to be further processed by the circuit SBB.

At a penultimate round R−1, the circuit XG2 may provide a data $X7<R>=X6<R-1> \oplus K[R-1] \oplus v$. The circuit XG5 may provide a data $X8<R>=X6<R-1> \oplus K[R-1] \oplus v \oplus u$, and the circuit XG6 may provide a data $X2<R>=X6<R-1> \oplus K[R-1] \oplus u$.

The circuit SBB may provide the data:

$$X4<R>=SB1[X2<R> \oplus K[R-1] \oplus u]=SBX[X3<R> \oplus K[R-1]] \oplus v. \quad (13)$$

The data X5<R> provided by the circuit SHR and which may be still masked by the mask parameter v, may be added to the last round key KT[R] by the circuit XG3. Thus, the circuit XG3 may provide a data:

$$X9<R>=X5<R> \oplus K[R] \oplus v. \quad (14)$$

The data X9<R> can be unmasked by the circuit XG7 which may provide the data:

$$CX1=X9<R> \oplus v=X5<R> \oplus K[R]. \quad (15)$$

It should be noted that all the data processed by the processing chain PA including the circuits XG1, SBB, SHR, MXC, XG2, XG5 and XG6, may substantially be masked by either the parameter u or the parameter v or both. Thus, the processing chain PA may form a protected area of the circuit CC1. The circuit CC1 can be implemented by software with a same level of protection, since this protection depends on masking operations which can be implemented by either hardware or software without a reduction of the protection level.

Additionally, the order of the operations should be examined when performing the operations of the circuit MXC to keep the masks on the data. According to AES algorithm, the data X provided to the circuit MXC may be presented in a matrix form including 4×4 elements x'<j>, j=0, 1, . . . 15, this matrix being multiplied in the circuit MXC by a coefficient matrix. Thus, the data provided by the circuit MXC may have a matrix form including 4×4 elements, wherein each element has the following form:

$$ax'<i> \oplus bx'<i+1> \oplus cx'<i+2> \oplus dx'<i+3>$$

where a, b, c, d (=1, 2 or 3) are elements of the coefficient matrix and i is equal to 0, 4, 8 and 12. For example, the first element of the resulting matrix is equal to:

$$A=2x'<0> \oplus 3x'<1> \oplus x'<2> \oplus x'<3>,$$

with each byte x'<j> being masked by a same mask M $(x'<j>=x<j> \oplus v)$, $3x=2x \oplus x$, and $a(x \oplus v)=ax \oplus av$. Thus:

$$A = 2x\langle 0\rangle \oplus 3x\langle 1\rangle \oplus 2v \oplus 3v \oplus x'\langle 2\rangle \oplus x'\langle 3\rangle$$
$$= 2x\langle 0\rangle \oplus 3x\langle 1\rangle \oplus 2v \oplus 2v \oplus v \oplus x'\langle 2\rangle \oplus x'\langle 3\rangle$$
$$= 2x\langle 0\rangle \oplus 3x\langle 1\rangle \oplus v \oplus x\langle 2\rangle \oplus v \oplus x'\langle 3\rangle$$
$$= 2x\langle 0\rangle \oplus 3x\langle 1\rangle \oplus x\langle 2\rangle \oplus x'\langle 3\rangle$$

Therefore, at this step of the computations, the mask v may be removed, which can form a leakage exploitable by a side channel analysis to determine the data X, even if the mask v reappears when the last XOR operation is performed:

$$A=(2x\langle 0\rangle \oplus 3x\langle 1\rangle \oplus x\langle 2\rangle \oplus x\langle 3\rangle)\oplus v.$$

In contrast, if the computation of element A is performed in the following order:

$$A=2x'\langle 0\rangle \oplus x'\langle 2\rangle \oplus x'\langle 3\rangle \oplus 3x'\langle 1\rangle,$$

we obtain:

$$A = 2x\langle 0\rangle \oplus x\langle 2\rangle \oplus x'\langle 3\rangle \oplus 3x'\langle 1\rangle \oplus 2v \oplus v$$
$$= 2x\langle 0\rangle \oplus x\langle 2\rangle \oplus x\langle 3\rangle \oplus 3x'\langle 1\rangle \oplus 3v \oplus v$$
$$= 2x\langle 0\rangle \oplus x\langle 2\rangle \oplus x\langle 3\rangle \oplus 3x'\langle 1\rangle \oplus 2v \oplus v \oplus v$$
$$= 2x\langle 0\rangle \oplus x\langle 2\rangle \oplus x\langle 3\rangle \oplus 3x\langle 1\rangle \oplus 2v \oplus 3v$$
$$= 2x\langle 0\rangle \oplus x\langle 2\rangle \oplus x\langle 3\rangle \oplus 3x\langle 1\rangle \oplus v$$

Therefore, when performing the XOR operations in the order of the coefficients a, b, c, d, which may be equal to (2 1 1 3), respectively, the result of each XOR operation may substantially be masked. The orders (1 2 1 3), (3 1 1 2) and (1 3 1 2) may also maintain the masking after each XOR operation. In some implementations, the mask v applied to the input data may be kept in the output data of the MXC operation.

When higher protection is needed, the procedure CPSB can be called at any time during the computation of an encrypted or decrypted data within the computation rounds to further mask the substitution table SBX. Thus, the procedure CPSB can be called at each round, provided that the data currently processed can be masked by the new mask parameters u and v and unmasked by the old mask parameters u and v.

The decryption according to AES algorithm may include substantially the same operations as the encryption algorithm. Therefore, the previously described protection method can be applied to protect a program and a circuit implementing AES decryption algorithm. More particularly, an AES decryption circuit may include circuits, which may perform XOR operations with round keys derived from the secret key SK, an inverse substitute calculation circuit, an inverse row-based circular permutation calculation circuit, and/or an inverse column-based permutation calculation circuit. The method illustrated in FIGS. 3 to 5 can be applied to AES decryption algorithm merely by replacing the circuits SBB, SHR and MXC by circuits implementing inverse operations. The inverse column-based permutation calculation circuit may also compute data having the following form:

$$ax\langle i\rangle \oplus bx\langle i+1\rangle \oplus cx\langle i+2\rangle \oplus dx\langle i+3\rangle,$$

where the coefficients (a, b, c, d) may be equal to (9, 11, 13, 14) with different orders. These coefficients may allow the XOR operations to be computed in any order without removing the mask, and the resulting data keeps the same mask as the input data.

Figure 6:
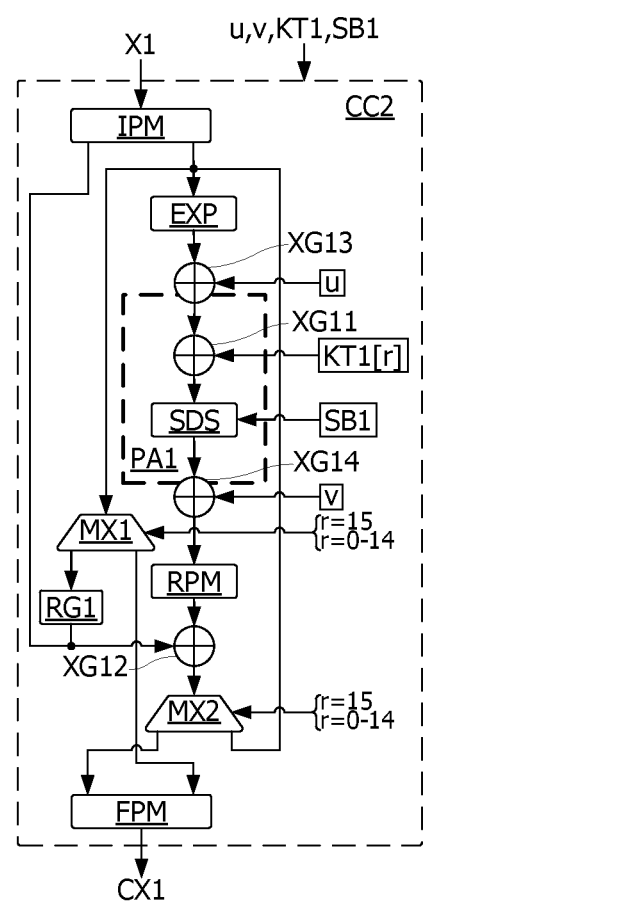
FIG. 6 is a block diagram of DES encryption algorithm including protection steps according to an example embodiment.

FIG. 6 illustrates a cryptographic calculation circuit CC2 implementing the DES algorithm for encrypting a data, in accordance to an example embodiment. For further details about DES algorithm, the document "Data Encryption Standard (DES) FIPS PUB 46-3" published on 25 Oct. 1999 can be referred to. In FIG. 6, the cryptographic calculation circuit CC2 may receive a data X1 to be processed and may supply a resultant data CX1. The circuit CC2 may also receive a round key table KT containing all round keys derived from a secret key according to DES algorithm. The circuit CC2 may include circuits XG11, XG12, which may perform XOR operations, an initial permutation circuit, an expansion circuit EXP, a substitute calculation circuit SDS, a rotation circuit RPM, one register RG1 and multiplexers MX1, MX2 and/or a final permutation circuit FPM. The input data X1, which may be encoded on a 64-bit word, may be applied to the initial permutation circuit IPM. The result of the permutation performed by the circuit IPM may be divided into a left and a right 32-bit word. The left word may be transmitted to the circuit XG12. The right word may be transmitted to the multiplexer MX1 and to the expansion circuit EXP which may provide a 48-bit word and to the register RG1. The multiplexer MX2 may have one output connected to a left input of the circuit FPM, and one output connected to the register RG1. The output word of the circuit EXP may be combined with a first round key KT1[0], which may also be encoded on 48 bits by the circuit XG11. The result of the operation performed by the circuit XG11 may be processed by the substitute calculation circuit SDS, which may provide a 32 bit word, and may be further processed by the rotation circuit RPM. The result of the RPM circuit may be combined by the circuit XG12 with the 32-bit word provided either by the circuit IPM, or the register RG1. The result provided by the circuit XG12 may be transmitted to the multiplexer MX2 having two outputs. A first output of the multiplexer MX2 may be connected to a right input of the circuit FPM and a second output of the multiplexer MX2 may be connected to the input of the multiplexer MX1 and of the circuit EXP.

At a first calculation round according to DES algorithm, the right 32-bit word in output of the circuit IPM may be stored in the register RG1 and processed by the circuits EXP, XG11, SDS, RPM and provided to the circuit XG12. The left 32-bit word in output of the circuit IPM may be transmitted to the input of the circuit XG12. The output of the circuit XG12 may be transmitted by the multiplexer MX2 to the multiplexer MX1 and the circuit EXP for a new calculation round. At a second calculation round, the word received by the multiplexer MX1 may be stored in the register RG1 and processed by the circuit EXP, XG11, SDS, RPM and XG12 which may receive the word in the register RG2.

At a 14th round, the multiplexer MX2 may transmit the word in output of the circuit XG12 to the multiplexer MX1 and to the circuit EXP to be further processed at a 15th and last round. At the 15th, the word at the output of the circuit XG12 may be provided by the multiplexer MX2 as a most significant word to a left input of the final permutation circuit FPM. At the same time, the multiplexer MX1 may provide the word previously provided by the circuit XG12 as a least significant word to a right input of the circuit FPM, which may output the output data CX1.

In some implementations, steps S30 to S32 of FIG. 4 are carried out to generate eight DES substitution tables SB1 and to get corresponding mask parameters u and v, which may be input to the circuit CC2 with the input data X1, and the round key table KT1. The mask parameter u encoded on 6 bits may be added by a circuit XG13 performing XOR operations to the word provided by the circuit EXP. The circuit SDS using one of the substitution tables SB1 may provide a result added to the mask parameter v encoded on 4 bits. The mask parameter v may be added by a circuit XG14 performing XOR operations to the output of the circuit SDS. As s result, the mask v may be removed from the word provided by the circuit SDS. Further, the words processed by the circuit CC2 may be protected from the output of the circuit XG13 to the input of the circuit XG14. All the data processed by the processing chain PA1 including the circuits XG11 and SDS, may always be masked by either the parameter u or the parameter v. Thus, the processing chain PA1 may form a protected area of the circuit CC2. The circuit CC2 can be implemented by software with a same level of protection, since this protection depends on masking operations which can be implemented by either hardware or software without a reduction of the protection level.

When higher protection is needed, the procedure CPSB can be called at any time during the computation of an encrypted or decrypted data within the computation rounds to further mask the substitution tables SB1. Thus, the procedure CPSB can be called at each round, provided that the data currently processed be masked by the new mask parameters u and v and unmasked by the old mask parameters u and v. The currently processed data can be also obtained from a previously processed data and the last input mask U or V.

The decryption according to DES algorithm includes substantially the same operations as the encryption algorithm. Therefore, the previously described protection method can be applied to protect a program and a circuit implementing the DES decryption algorithm.

FIG. 7 illustrates (operations, functions, processes, etc.) steps S41 to S47 of a procedure CPS1 generating a masked substitution table SB1 from another substitution table SB0, according to an example embodiment. The procedure CPS1 may receive the substitution table SB0 to be masked and mask parameters u0, v0, w0, and may provide a masked substitution table SB1, and updated mask parameters u1, v1, w1. At step S41, an input masks U, V and W may be determined between 0 and a maximum value. For the input mask U, the maximum value may be a value M, for the input mask V, the maximum value may be a value N, and for the input mask W, the maximum value may be the greatest value between the values M and N. The input masks U, V, W can be chosen randomly. The value M may correspond with the amount of data in the substitution table SB0 minus one, and the value N may correspond with the maximum value of the data in the table SB0. At step S42, the mask parameters u1, v1, w1 may be computed using the masks input U, V, W and the previous values of the mask parameters u0, v0, w0, as follows:

$$u1=u0\oplus W\oplus U$$

$$v1=v0\oplus W\oplus V \quad (16)$$

$$w1=w0\oplus W \quad (17)$$

The XOR operations may be performed in the order presented in each of the equations (16). The parameter W may be truncated when combined with data (U or V) of smaller size. It results from the equation (16) that the parameter u0 may be masked by the input masks W and U, the parameter v0 may be masked by the input masks W and V and the parameter w0 may be masked by the input mask W.

At step S43, an index i may be initialized to zero (0). At step S44, the index i may be used to select an output data SB0[i] in the substitution table SB0 and the selected output data SB0[i] may be masked by combining it with the input mask V by an XOR operation. The result of the XOR operation SB0[i]⊕V may be stored in the masked substitution table SB1 at an index i⊕U resulting from the combination by an XOR operation of the index i with the input mask U:

$$SB1[i\oplus U]=SB0[i]\oplus V. \quad (18)$$

At step S45, the index i may be incremented by one (1). At step S46, the index i may be compared with the value M. If the index i is greater than the value M, step S47 may be executed; otherwise steps S44 to S46 may be executed again for a new iteration. At step S47, the masked substitution table SB1 may be completely defined and may be provided as output of the procedure CPS1 with the updated parameters u1, v1 and w1.

It should be observed that the masked table computed at step S44 can be obtained by several others ways, defined in the following equations examples:

$$SB1[i]=SB0[i\oplus U]\oplus V. \quad (19)$$

$$SB1[pr[i]\oplus U]=SB0[pr[i]]\oplus V. \quad (20)$$

$$SB1[pr[i]]=SB0[pr[i]\oplus U]\oplus V. \quad (21)$$

with pr[i] being a permutation over the set of integer numbers {0, . . . , M}.

In addition, the permutation pr can be randomly generated, for example each time the masked substitution table SB1 may be computed from a previous table SB0. Thus, the permutation pr may enable the elements of the masked substitution table SB1 to be computed in a random order.

FIG. 8 illustrates steps (operations, functions, processes, etc.) S50 to S58 of a procedure using a substitution table SBX, according to an example embodiment. The procedure may include initialization steps S50 to S52. At step S50, the mask parameters u, v, and w may be initialized to zero (0). At step S51, the procedure CPS1 may be called using as parameters the substitution table SBX, the mask parameters u, v, w and a table SB1 resulting from masking the table SBX. Thus after step S51, $$u<1>=W<1>\oplus U<1>,$$

$$v<1>=W<1>\oplus V<1>,$$

$$w<1>=W<1>, \text{and}$$

$$SB1<1>[i\oplus U<1>]=SBX[i]\oplus V<1> \quad (22)$$

where "X<t>" refers to the value of a parameter X at an iteration t.

At step S52, the procedure CPS1 may be called again one or more times using as parameters the masked substitution table SB1 provided by the previous call to the procedure CPS1. The mask parameters u, v, w may be updated by the previous call to the procedure CPS1, and the masked substitution table SB1 may be intended to receive the masked result of the table SB1. Thus, after the second call of the procedure CPS1 at step S52, the parameters u, v and w and the masked substitution table SB1 are computed as follows:

$$u<2>=u<1>\oplus W<2>\oplus U<2>,$$

$$v<2>=v<1>\oplus W<2>\oplus V<2>,$$

$$w<2>=w<1>\oplus W<2> \text{ and}$$

$$SB1<2>[i\oplus U<2>]=SB1<1>[i]\oplus V<2>. \quad (23)$$

After step S52, when the procedure CPS1 is called t−1 times, the parameters u, v and w have the following values:

$$u<t>=u<t-1>\oplus W<t>\oplus U<t>,$$

$$v<t>=v<t-1>\oplus W<t>\oplus V<t>, \text{ and}$$

$$w<t>=w<t-1>\oplus W<t>. \quad (24)$$

In addition, a current masked substitution table SB1<t> is computed from a previous masked substitution table SB1<t−1> as follows:

$$SB1<t>[i\oplus U<t>]=SB1<t-1>[i]\oplus V<t>. \quad (25)$$

At step S53, one masked input data MD1 may be processed by an algorithm using the masked substitution table SB1. The input data MD1 may be masked by combining the last updated value u<t> of the parameter u1 by an XOR operation. At step S54, an output masked data MSR1 may be selected in the masked substitution table SB1 using as an index the data MD1⊕w, obtained by adding the input data MD1 to the last value w<t> of the parameter w by an XOR operation.

At step S55, the procedure CPS1 may be called again for updating the masked substitution table SB1 and the parameters u, v and w. Such an update may be for example performed between two successive readings of the masked substitution table SB1 or between two successive encryptions or decryptions of a message. At step S56, a new masked data MD2 (equal to a non-masked data D2 combined by an XOR operation with the last updated parameter u1) may be input to perform a substitution operation of the data D2 using the substitution table SBX. To this end, the masked data MD2 may be combined with the updated parameter w by an XOR operation and used as index to select a masked substituted data in the masked substitution table SB1 (step S57). The substitution operation may provide a masked data MSR2. At step S58, the masked data MSR2 can be unmasked to obtain an unmasked data SR2 (=(MSR2⊕v1)⊕w1) by combining the masked data MSR2 by XOR operations first with the parameter v and then with the mask parameter w.

When considering the parameters:

$$u'<t>=u'<t-1>\oplus U<t>, \text{ and}$$

$$v'<t>=v'<t-1>\oplus V<t>, \quad (26)$$

it follows that:

$$u'<t>\oplus w<t>=u'<t-1>\oplus w<t-1>\oplus W<t>\oplus U<t>$$

$$v'<t>\oplus w<t>=v'<t-1>\oplus w<t-1>\oplus W<t>\oplus V<t>, \quad (27)$$

and that:

$$u<t>=u'<t>\oplus w<t>, \text{ and}$$

$$v<t>=v'<t>\oplus w<t>. \quad (28)$$

Thus, u'<t> and v'<t> may be hidden parameters resulting from masking the parameters u<t> and v<t>, using as mask the parameter w<t> for each iteration t from t=2. From the above definitions and properties of SB1, u' and v', and by applying the equation (25) to several iterations t, the content of the masked substitution table SB1<t> can be expressed as follows:

$$SB1<t>[i\oplus U<t>]=SBX[i\oplus u'<t-1>]\oplus v'<t-1>\oplus V<t>. \quad (29)$$

When replacing the index i by i⊕u'<t−1> in equation (29), it becomes:

$$SB1<t>[i\oplus U<t>\oplus u'<t-1>]= SBX[i]\oplus v'<t-1>\oplus V<t>. \quad (30)$$

Thus by considering the equations (26), it can be deduced the following equation:

$$SB1<t>[i\oplus u'<t>]=SBX[i]\oplus v'<t>. \quad (31)$$

It results that the substitution table SBX, as well as the mask parameters u'<t> and v'<t> may not be used in the computations of the masked tables SB1<t> in the procedure CPS1, after the execution of step S51. Therefore, if the first masked table SB1<1> is computed from the substitution table SBX in a protected area, a two order side channel analysis cannot exploit a leakage both on a masked data D⊕U<t> and on the mask U<t> to discover the data SBX[D].

When the amount of data in the table SBX is different from the maximum value of the data in the table, another mask parameter y can be used. The mask parameter w may have the same size as the mask parameters u and U, and the mask parameter y may have the same size as the mask parameters v and V. Therefore, at step S22, the mask parameters are computed as follows:

$$u1=u0\oplus W\oplus U$$

$$v1=v0\oplus Y\oplus V$$

$$w1=w0\oplus W$$

$$y1=y0\oplus Y \quad (32)$$

The masked substitution table SB1 may still be computed as defined by the equation (18). The equation (31) may remain unchanged but the mask parameters u' and v' are defined as follows:

$$u<t>=u'<t>\oplus w<t>, \text{ and}$$

$$v<t>=v'<t>\oplus y<t>. \quad (33)$$

At steps S54 and S57, the index to be used to select a data in the substitution table SB1 is D⊕u1⊕w1, D being an unmasked data, and a masked data MSR selected in a substitution table can be unmasked by adding it to XOR operations with the parameters v1 and y1.

It is noted that the equations (32) and (33) are applicable even when the amount of data in the substitution table SBX is the same as the maximum value of the data in the table. Thus, distinct input masks W, Y, and mask parameters w and y can also be used to compute the mask parameters u and v.

The previously disclosed methods using the mask parameter w cannot prevent three or higher order side channels analyses, detecting and combining three data leakages, from D⊕u'<t>, u'<t>⊕w<t> and w<t>, in order to discover the value of the data D. On the other hand, exemplary methods as described herein can be adapted to prevent such analyses.

FIG. 9 illustrates steps (operations, functions, processes, etc.) S61 to S67 of a procedure CPS2 derived from the procedure CPS1 for preventing a three order side channel analysis, according to another example embodiment. As in the procedure CPS1, the procedure CPS2 may generate a masked substitution table SB1 from another substitution table SB0. Step 61 differs from step S41 in that another mask input Z may be chosen between 0 and the greatest value between the values M and N. In some implementations, the mask input Z may be chosen randomly. Step 62 differs from step S42 in that the parameter w may now be updated using in addition the mask Z which is combined with the mask W by an XOR operation:

$$w1 = w0 \oplus W \oplus Z \tag{34}$$

Step 62 may also include updating a parameter x by combining it with the mask X by an XOR operation:

$$z1 = z0 \oplus Z \tag{35}$$

Steps 63 to S66 are the same as steps S43 to S46. Step S67 differs from step S47 in that the parameter x0 is an input and the parameter z1 an output of the procedure CPS1.

FIG. 10 illustrates steps (operations, functions, processes, etc.) S70 to S78 of another procedure using the substitution table SBX, in relation to the example embodiment of FIG. 4. This procedure may include optional initialization steps S70 to S72. Step S70 differs from step S50 in that the parameter z0 may also be initialized to zero (0). Steps S71, S72 and S75 differ from steps S51, S52 and S55 in that the procedure CPS2 may be called instead of the procedure CPS1. As a consequence, the parameters z0 and z1 appear in the calls to the procedure CPS2 at steps S71, S72 and S75. In steps S72a and S75a, the mask parameter z0 may further be set to the value of the mask parameter z1 provided by a previous call to the procedure CPS2. Steps S73 and S76 may be the same as steps S53 and S56 to process the data D1 and D2 masked by the parameter u1. The substitution operation using the substitution table SBX performed at steps S74 and S77 differs from the one performed at steps S54 and S57 in that the masked data MD1, MD2 may further be masked using both the parameters w1 and z1 by XOR operations. Each of the masked data MSR1, MSR2 obtained at steps S74 and S77 can be unmasked to obtain the data SR1 and SR2, by combining the masked data MSR1, MSR2 with the parameters v1, w1 and z1 by XOR operations (step S78).

The masking procedure CPS2 illustrated in FIG. 9 may be vulnerable to fourth order or higher order side channel analyses combining four leakages from $D \oplus u'<t>$, $u'<t> \oplus w'<t>$, $w'<t> \oplus z'<t>$ and $z<t>$, with $w'<t> = w<t> \oplus z<t>$. However, the methods previously disclosed may be easily adaptable to prevent side channel analyses of higher order, simply by adding another level of masking, using another mask parameter zz, for hiding the mask z, and so on. Thus, the new masked substitution table can be generated by selecting input masks of rank 1 to n, n being an integer number greater than one, for each rank j from 1 to n−1, computing a new value of a mask parameter of rank j by combining by XOR operations the previous value of the mask parameter of rank j with the input masks of ranks j and j+1, and computing a new value of a mask parameter of rank n by applying XOR operations to a previous value of the mask parameter of rank n and to the input mask of rank n. When using mask parameters up to rank n, the substitution operation may include applying XOR operations to the masked input data with each of the mask parameters of ranks one to n. The masked output data of the substitution operation corresponding to the output data of the substitution operation, may be combined by XOR operations with the second mask parameter and with each of the mask parameters of ranks one to n.

When the amount of data in the table SBX is different from the maximum value of the data in the table, two mask parameters can be used for each rank one to n, first mask parameters of ranks one to n having a same size as the input mask U, and second mask parameters of ranks one to n having a same size as the input mask V.

Figure 11:
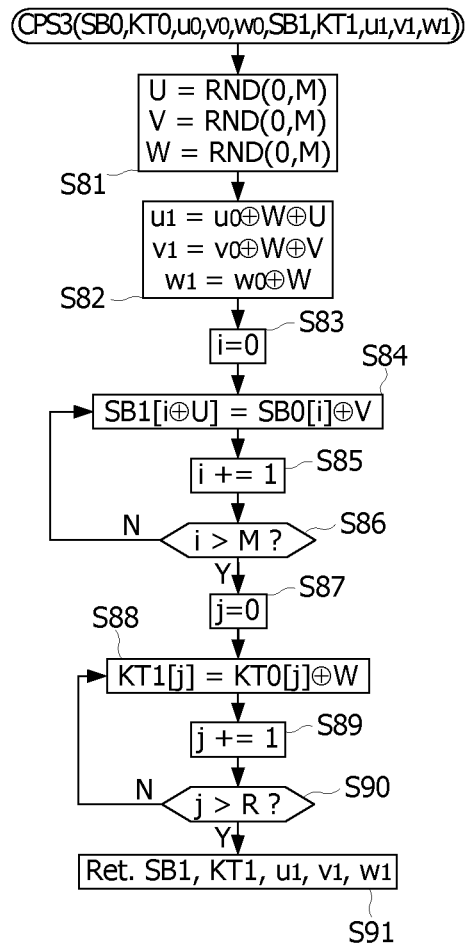
FIG. 11 illustrates protection steps adapted to AES algorithm, according to an example embodiment.

FIG. 11 illustrates steps (operations, functions, processes, etc.) S81 to S91 of a procedure CPS3 derived from the procedure CPS1 to be adapted to AES algorithm in accordance to an example embodiment. Steps S81 to S86 may be the same as steps S41 to S46. The parameters U, V, W, u0, v0, w0, u1, v1, w1 may have the size of one byte (the values M and N are the same). The procedure CPS3 may also receive a substitution table SB0 which can be the substitution table SBX used by AES algorithm or a previously masked substitution table, and a round key table KT0 which can be the round key table KT containing all round keys derived from a secret key according to AES algorithm, or a previously masked round key table KT0. At steps S84 to S86, the substitution table SB0 may be masked by the parameters U and V which can be randomly selected at step S81. At step S87, an index j may be initialized to zero (0). At step S88, the index j may be used to select a round key KT0[j] in the round key table KT0. Each byte of the selected round key KT0[j] may be added to the parameter W by an XOR operation and the resulting masked round key KT1[j] may be stored in the round key table KT1 at the same index j. At step S89, the index j may be incremented by one (1). At step S90, the index j may be compared with a maximum value R corresponding to the number of rounds performed by the considered AES algorithm. If the index j is greater than the value R, step S91 may be executed; otherwise steps S88 to S90 may be executed again for a new iteration. At step S91, the masked table KT1 may be provided as output of the procedure CPS3 with the masked substitution table SB1 computed at steps S84 to S86 and with the updated parameters u1, v1 and w1 computed at step S82.

Figure 12:
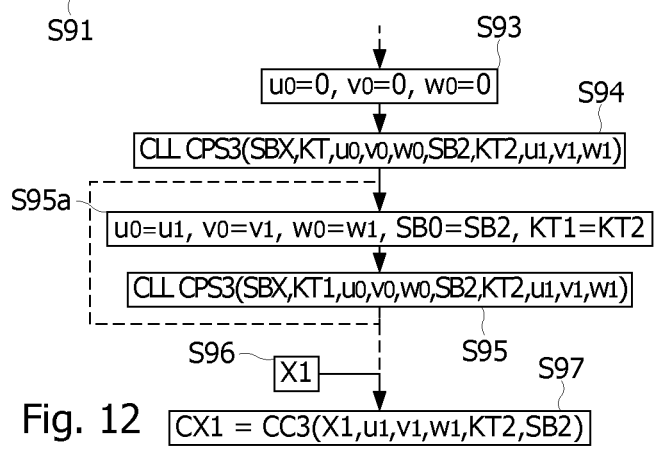
FIG. 12 illustrates protection steps adapted to AES algorithm, according to another example embodiment.

FIG. 12 illustrates steps (operations, functions, processes, etc.) S93 to S97 which may be executed to call the procedure CPS3 several times to compute parameters u1, v1, w1, and to generate a masked substitution table SB2 and a masked round key table KT2. This procedure may include optional initialization steps S93 to S94. At step S93, the mask parameters u0, v0, and w0 may be initialized to zero (0). At step S94, the procedure CPS3 may be called using as parameters the substitution table SBX used in AES algorithm, the mask parameters u, v, w, the round key table KT2 and a masked substitution table SB2 computed from the table SBX. At step S95, the procedure CPS3 may be called one or more times using as parameters the masked substitution table SB2 provided by the previous call to the procedure CPS3, the mask parameters u1, v1, w1 updated by the previous call to the procedure CPS3, and the masked round key table KT2 provided by the previous call to the procedure CPS3. The table SB2 may be intended to receive the masked result of the previous table SB2. At a previous step S95a, the mask parameters u0, v0, w0 can be set to the updated mask parameters u1, v1, w1. The tables SB0 and KT1 can be set to the updated tables SB2 and KT2. At step S96, a data X1 to be processed may be introduced. At step S97, a circuit CC3 implementing the AES algorithm may be activated. The circuit CC3 may receive the data X1, the parameters u, v, w, and the masked tables SB2 and KT2. The circuit CC3 may return an output data CX1, resulting from encryption or decryption of the data X1 by AES algorithm.

Figure 13:
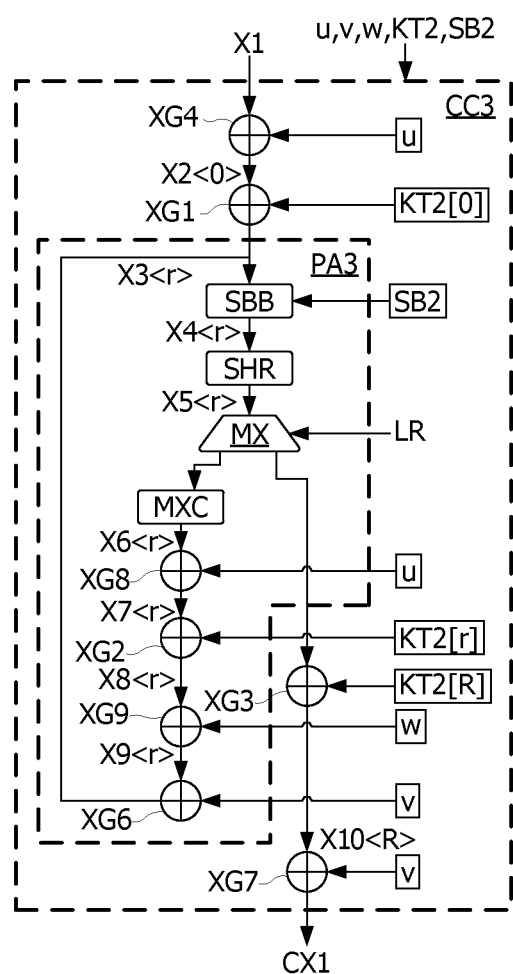
FIG. 13 is a block diagram of AES encryption algorithm, including protection steps according to an example embodiment.

FIG. 13 illustrates a cryptographic calculation circuit CC3 implementing the AES algorithm for encrypting a data in accordance to another example embodiment. In some implementations, the circuit CC3 differs from the circuit CC1 in that the circuit CC3 may include additional circuits XG8 and XG9 which may perform XOR operations with the mask parameters u and w, respectively, but does not include the circuit XG5. Each of the circuit XG4 and XG6 to XG9 may receive one of the mask parameters u, v, w, having the size of one word (e.g. one byte), and an input data of several words of the size of the mask parameter (16 bytes in the illustrated example), and may perform an XOR operation with the mask parameter u, v, w for each word of the size of the mask parameter included in the input data.

The circuit XG8 may be interposed between circuits MXC and XG2. The circuit XG9 may be interposed between the circuits XG2 and XG6.

The circuit XG4 may provide a data X2<0> resulting from masking the data X1 by the mask parameter u, (i.e., by the parameter u'$^\oplus$w). This correlates to each word of the size of the parameter u within the data X1 is masked by the parameter u. As a result of step S88 (FIG. 11) executed several times, the round key KT[0] may be previously masked by the parameter w (KT2[0]=KT[0]$^\oplus$w). Thus, the circuit XG1 may provide at the input of the circuit SBB the data:

$$X3<0>=X2<0>\oplus KT2[0]=X1\oplus u'\oplus w\oplus KT[0]\oplus w=X1\oplus KT[0]\oplus u', \quad (36)$$

KT[0] being the first round key without mask. Therefore, the expected data $X1^\oplus$ KT[0] to be normally provided to the circuit SBB may be masked by the masked parameter u' (=u$^\oplus$w) which is not computed. The circuit SBB which may be implemented using the masked substitution table SB2 provides the data:

$$X4<0>=SB1[X1\oplus K<0>\oplus u']=SB2[X1\oplus K<0>]\oplus v' \quad (37)$$

(see equation (31)). Thus the expected data SB2[X1$^\oplus$KT[0]] normally provided by the circuit SBB may be masked by the masked parameter v' (=v$^\oplus$w) which may not be computed. The circuits SHR and MXC may provide expected result data X5<0> and X6<0>, respectively, still masked by the masked parameter v'. At the output of the circuit XG8, the data X7<0> may further be masked by the parameter u (=u'$^\oplus$w). The circuit XG2 may add to the masked value X7<0>, the masked round key KT2[1]=KT[1]$^\oplus$w, KT[1] being the second round key without mask. Then the circuit XG2 provides the data:

$$X8<0>=X7<0>\oplus KT2[1]=X6<0>\oplus u'\oplus w\oplus KT[1]\oplus w. \quad (38)$$

At the output of the circuit XG9, the data X9<0> is further masked by the parameter w. Thus, at the output of the circuit XG9, the data X9<0> is masked by the parameter u'$^\oplus$v'.

Since v=v'$^\oplus$w, the circuit XG6 provides the data:

$$X3<1>=X9<0>\oplus v=KT[1]\oplus X6<0>\oplus u', \quad (39)$$

which is masked by the parameter u' as the data provided by the circuit XG1. Thus the data X3<1> is ready to be further processed by the circuit SBB.

At a penultimate round R−1, the circuit XG6 provides a data:

$$X3<R>=X8<R-1>\oplus KT[R-1]\oplus u'. \quad (40)$$

The circuit SBB provides the data:

$$X4<R>=SB2[X3<R>]=SBX[X3<R>\oplus u']\oplus v'. \quad (41)$$

The data X5<R> provided by the circuit SHR and which is still masked by the parameter v', is added to the last round key KT2[R] (=KT[R]$^\oplus$w) by the circuit XG3. Thus the circuit XG3 provides the data:

$$X10<R>=X5<R>\oplus KT[R]\oplus v'\oplus w=X5<R>\oplus KT[R]\oplus v. \quad (42)$$

Then the circuit XG7 provides the data:

$$CX1=X10<R>\oplus v=X5<R>\oplus KT[R], \quad (43)$$

by removing the mask v from the data X10<R>.

In some implementations, all of the data processed by the processing chain PA2 including the circuits SBB, SHR, MXC, XG8, XG9, XG2, XG6 and XG3, may always be masked by either the parameter u' or the parameter v' or both, which are never computed nor directly used, since the circuits SBB, SHR, MXC, XG8, XG9, XG2, XG6 and XG3 may be always masked by the parameter w. Thus, the processing chain PA2 may form a protected area of the circuit CC3. The circuit CC3 can be implemented by software with a same level of protection, since this protection depends on masking operations which can be implemented by either hardware or software without a reduction of the protection level.

When higher protection is needed, the procedure CPS3 can be called at any time during the computation of an encrypted or decrypted data within the computation rounds. The current value of the processed data just needs to be combined by an XOR operation with the random parameter U or V determined at step S81 of the procedure CPS3 each time this procedure is called.

The protection method illustrated in FIGS. 11 to 13 can be applied to algorithms AES-128, AES-192 and AES-256, since they differ from one another only by their number of rounds.

The XOR operations in the circuit MXC should be performed in an order that does not remove the mask v' from the processed data X5<j> or a part thereof.

The protection method illustrated in FIGS. 11 to 13 can be applied to protect a program and a circuit implementing AES decryption algorithm, merely by replacing the circuits SBB, SHR and/or MXC by circuits implementing inverse operations.

Example embodiments as illustrated in FIGS. 9 and 10 can also be applied to AES algorithm for preventing higher order side channel analyses, simply by adding an XOR circuit after the circuit XG6 to perform an XOR operation with the parameter x.

Figure 14:
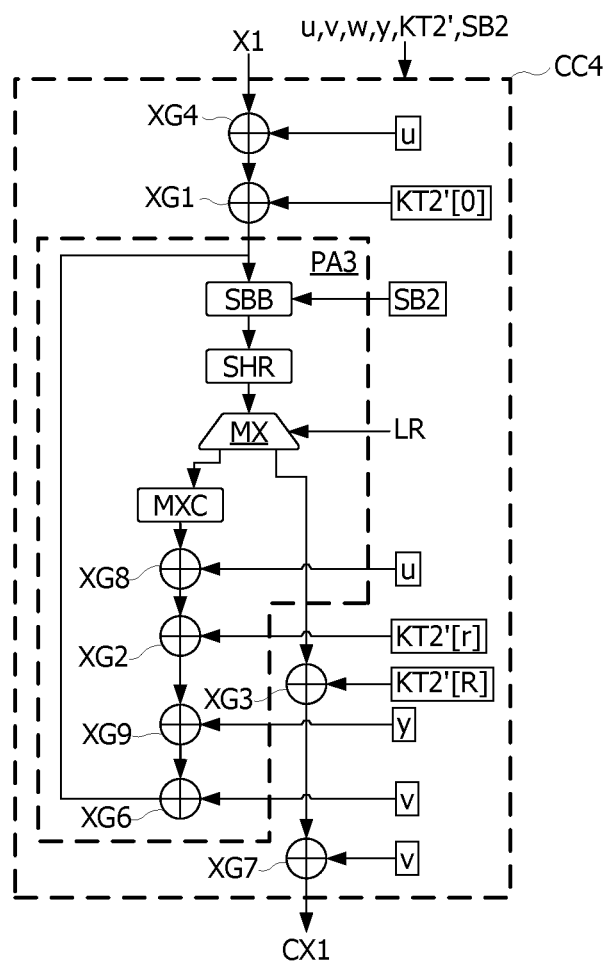
FIG. 14 is a block diagram of AES encryption algorithm, including protection steps according to another example embodiment.

FIG. 14 illustrates a cryptographic calculation circuit CC4 implementing AES algorithm for encrypting a data in accordance to another example embodiment. The circuit CC4 may be protected by applying the above-described methods using two different mask parameters w and y applied to the mask parameters u and v, respectively. The circuit CC4 may differ from the circuit CC3 in that the circuit XG9 may receive the mask parameter w1 instead of the mask parameter w, and in that circuit CC4 may include two additional circuits XG10 and XG1a, which may perform XOR operations arranged between the multiplexer MX and the circuit XG3. The circuit XG10 may receive the output data of the circuit SHR via the multiplexer and the parameter w. The circuit XG1a may receive the output data of the circuit XG10 and the parameter w1. The output of the circuit XG1a may be provided to the circuit XG3. The circuits XG10 and XG1a may remove the mask parameters w and w1 from the data provided at the last round by the circuit SHR.

Figure 15:
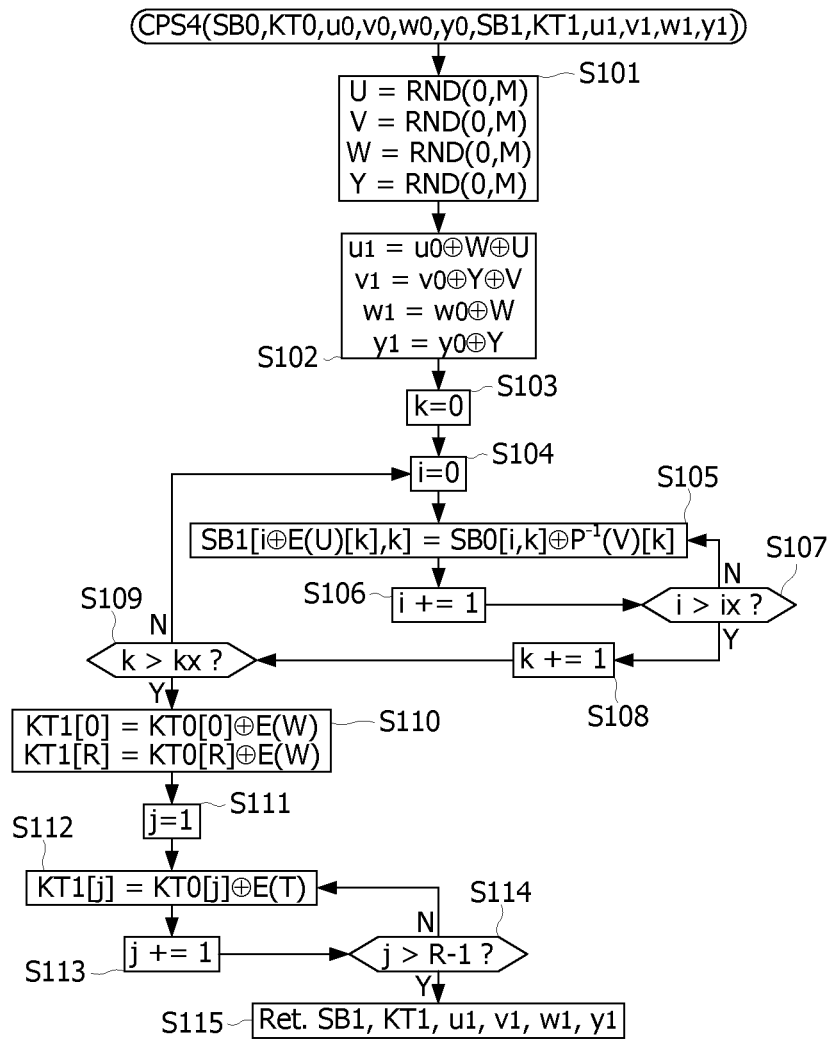
FIG. 15 illustrates protection steps adapted to DES algorithm, according to an example embodiment.
Figure 16:
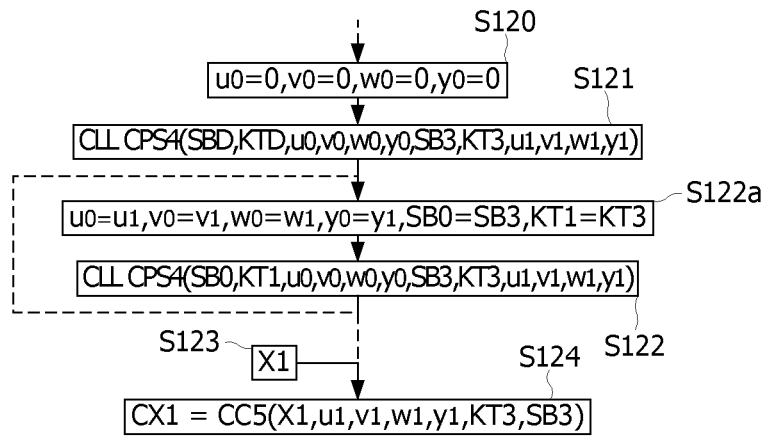
FIG. 16 illustrates protection steps adapted to DES algorithm, according to another example embodiment.
Figure 17:
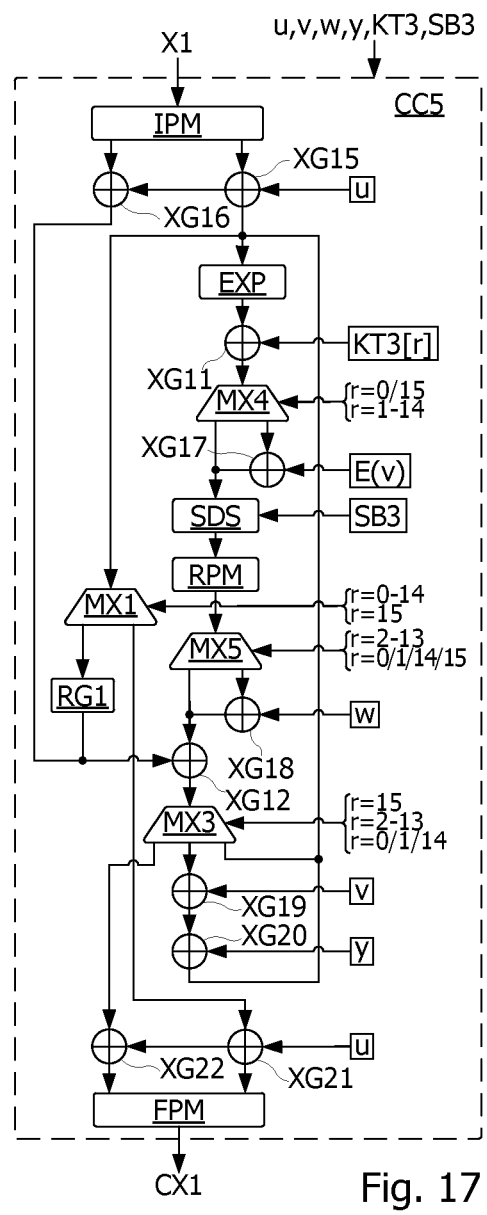
FIG. 17 is a block diagram of the DES encryption algorithm, including protection steps according to another example embodiment.

The above-described protection can be also applied to other cryptographic algorithms combining XOR operations and substitution operations using substitution tables. FIGS. 15 to 17 illustrate application of this method to DES algorithm.

FIG. 15 illustrates steps (operations, functions, processes, etc.) S101 to S115 of a procedure CPS4 derived from the procedure CPSB to be adapted to the DES algorithm in accordance with another example embodiment. The procedure CPS4 may receive a set of eight substitution tables SB0[k] to be processed, which can be those defined for DES algorithm or a previously masked substitution table. The procedure CPS4 may also receive mask parameters u0, v0, w0, y0 encoded on 32 bits and a round key table KT0 containing round keys derived from a secret key according to DES algorithm or masked round keys. The procedure CPS4 may provide the masked substitution table SB1, a masked round key table KT1 and updated parameters u1, v1, w1, y1. At step S101, input masks U, V, W and Y may be determined between 0 and a maximum value M equal to 232−1. The input masks U, V, W and Y can be chosen randomly. At step S102, the mask parameters u1, v1, w1, y1 may be computed using the input masks U, V, W, Y and the mask parameters u0, v0, w0, y0, according to equations (32).

At step S103, an index k may be initialized to zero (0). At step S104, an index i may be initialized to zero (0). At step S105, the table SB1 may be updated using the following equation:

$$SB1[i \oplus E(U)[k],k] = SB0[i,k] \oplus P-1(V)[k] \quad (44)$$

where SB0[ . . . , k] represents a DES substitution table of rank k (with k=0 to 7), each table SB0[ . . . , k] including 16×4 4-bit words which can be selected using 6-bit indexes, E(U) represents a 48-bit word resulting from the DES expansion operation applied to the mask U, E(U)[k] represents a 6-bit word of rank k in the word E(U), P−1(V) represents a 32-bit word resulting from the reverse round permutation operation P−1 applied to the mask V, and P−1(V)[k] represents a 4-bit word of rank k in the word P−1(V).

At step S106, the index i may be incremented by one (1). At step S107, the index i may be compared with a maximum value ix which is equal to 26−1 (=63). If the index i is greater than the value ix, steps S108 and S109 may be executed; otherwise steps S105 to S107 may be executed again for a new iteration. At step S108, the index k may be incremented by one (1). At step S109, the index k may be compared with a maximum value kx which is equal to 7. If the index k is greater than the value kx, steps S110 to S115 may be executed; otherwise steps S104 to S109 may be again executed for a new iteration.

Step S110 may compute masked first and last DES round keys KT1[0] and KT1[R] from a round key table KT0 containing all round keys derived from a secret key according to DES algorithm or a masked round key table. Each round key KT0[j] in the table KT0 may be a 48-bit word. The masked round keys KT1[0] and KT1[kx] may be computed by an XOR operation applied to the result provided by the DES expansion operation E applied to the parameter W. At step S111, an index j may be initialized to one (1). At step S112, the index j may be used to select a round key KT1[j] in the round key table KT1. The selected round key KT1[j] may be computed by masking the round key KT0[j] by an XOR operation by the result of the DES expansion operation E applied to the input parameter T. At step S113, the index j may be incremented by one (1). At step S114, the index j may be compared with a maximum value R minus one (1) corresponding to the number of rounds (16, R=15) performed by the DES algorithm. If the index j is greater than the value R−1, step S115 may be executed; otherwise steps S112 to S114 may be executed again for a new iteration. At step S115, the masked table KT1 may be provided as output of the procedure CPS4 with the masked substitution table SB1 computed at steps S104 to S109 and with the updated parameters u1, v1, w1 and y1 computed at step S102. Here again, the elements of the masked tables SB1 and KT1 can be computed in a random order.

FIG. 16 illustrates steps (operations, functions, processes, etc.) S120 to S124 which may be executed to call the procedure CPS4 several times to compute parameters u1, v1, w1, y1, a masked substitution table SB3 and a masked round key table KT3. This procedure may include optional initialization steps S120 and S121. At step S120, the mask parameters u0, v0, w0 and t0 may be initialized to zero (0). At step S121, the procedure CPS4 may be called using as parameters the substitution table SBD and the round key table KTD, defined for DES algorithm, the mask parameters u0, v0, w0, y0, a round key table KT3, a masked substitution table SB3 computed from the tables KTD and SBD, and updated parameters u1, v1, w1, y1. At step S122, the procedure CPS4 may be called one or more times using as parameters the masked tables SB3, KT3 provided by the previous call to the procedure CPS4, the mask parameters u1, v1, w1, y1 updated by the previous call to the procedure CPS4, the tables KT3 and SB3 being intended to receive the masked result of the previous tables KT3 and SB3. Before step S122, step S122a can set the parameters u0, v0, w0, y0 to the values of the previously computed mask parameters u1, v1, w1, y1. The tables SBD and KTD can be set to the updated tables SB3 and KT3.

At step S123, a data X1 to be processed may be introduced. At step S124, a circuit CC5 implementing DES algorithm may be activated. The circuit CC5 may receive the data X1, the updated mask parameters u1, v1, w1, y1 and the masked tables SB3 and KT3. The circuit CC5 may return an output data CX1, resulting from encryption or decryption of the data X1 by the DES algorithm.

FIG. 17 illustrates a cryptographic calculation circuit CC5 implementing DES algorithm for encrypting a data in accordance with another example embodiment. The circuit CC5 may differ from the circuit CC2 in that the circuit CC5 includes additional circuits XG15, XG16, XG17, XG18, XG19, XG20, XG21 and XG22 and multiplexers MX3, MX4 and MX5, but does not include the circuits XG13, XG14 and MX2. The circuits XG15 to XG22 may perform XOR operations with the mask parameters u, u, E(v), w, v, y, u and u, respectively. The circuits XG15 and XG16 may add by XOR operations the 32-bit mask parameter u respectively to the right and left words in output of the circuit IPM. The multiplexer MX5 may supply the word in output of the circuit XG11 either to the circuit SDS at the rounds 0 and 15 or to the circuit XG17 at the other rounds 1 to 14. The circuit XG17 may combine a 48-bit word provided by the circuit EXP with the parameter E(v) having also 48 bits. The parameter E(v) resulting from the application of the expansion function implemented by the circuit EXP to the 32-bit mask parameter v. The multiplexer MX6 may supply the word provided by the circuit RPM either to the circuit XG12 at the rounds 2 to 13 and to the circuit XG18 at the other rounds 0, 1, 14 and 15. The circuit XG18 may combine the 32-bit word provided by the circuit RPM with the 32-bit parameter w. The multiplexer MX3 may supply the word in output of the circuit XG12 either to the multiplexer MX1 and the circuit EXP at the rounds 0, 1 and 14, or to the circuit XG19 at rounds 2 to 13, or to the circuit XG22 at the last round (15). The circuit XG19 may apply XOR operations to the 32-bit mask parameter v and to a word of the same size computed by the circuit XG12 and transmitted by the multiplexer MX1. The circuit XG20 may apply XOR operations to the 32-bit mask parameter y and to a word of the same size computed by the circuit XG19. The output of the circuit XG20 may be connected to the input of the multiplexer MX1 and the circuit EXP. The circuit XG21 may apply XOR operations to the 32-bit mask parameter u and to a word of the same size provided by the multiplexer MX1, at the last round. The output of the circuit XG21 may be connected to the right input of the final permutation circuit FPM. The circuit XG22 may apply XOR operations to the 32-bit mask parameter u and to a word of the same size provided by the multiplexer MX3. The output of the circuit XG22 may be connected to the left input of the final permutation circuit FPM.

As a result, at the first round (0), the most and least significant words in output of the circuit IPM may be masked by the mask parameter u by the circuit XG15 and XG16. As a consequence, the word in output of the circuit EXP may be masked by the parameter E(u) resulting from the application of the expansion function E to the mask parameter u. When using the masking of the round key KT3[0], the word provided by the circuit XG11 may be masked by the parameter $E(u \oplus w)$. Therefore, the words processed by the circuit CC5 may be protected from the circuit XG11. Further, when using the masking of the substitution table SB3 performed by the procedure CPS4, the word provided by the circuit SDS may be masked by the parameter $P-1(v \oplus y)$. Thus, the word in output of the circuit RPM may be masked by the parameter $v \oplus t$. The word provided by the circuit XG12 may be masked by the parameter $u \oplus v \oplus w \oplus y$.

At the second round (1), the word in output of the circuit EXP may be masked by the parameter $E(u \oplus w) \oplus E(v \oplus y)$. The word at the output of the circuit XG11 may be masked by the parameter $E(u^w)^E(v)$ which may further be masked by the parameter E(v). Accordingly, the circuit SDS may receive a word masked by the parameter $E(u^w)$. The word provided by the circuit SDS may be masked by the parameter $P-1(v \oplus y)$. Accordingly, the word in output of the circuit RPM may be masked by the parameter $v \oplus y$. The word provided by the circuit RPM may be further masked by the mask parameter w. Besides, the word in the register RG1 may be masked by the parameter u. Therefore, the word provided by the circuit XG12 and further applied to the circuit EXP may be masked by the parameter $u \oplus w \oplus v \oplus y$.

At the rounds 2 to 13, the masking of the resulting words may be the same, except at the output of the circuit XG12, since the word received from the register RG1 may also be masked by the parameter $u \oplus w \oplus v \oplus y$. Thus, the word in output of the circuit XG12 may be masked by the parameter $u \oplus w$, and may further be masked by the parameter $v \oplus y$.

At the round 14, the word in output of the circuit RPM already masked by the parameter $v \oplus y$, may further be masked by the mask parameter w by the circuit XG18 and may be provided to the circuit XG12. Besides the word in the register RG1, the register RG1 may be masked by the parameter $u \oplus w \oplus v \oplus y$. Therefore, the word provided by the circuit XG12 may only be masked by the mask parameter u.

At the beginning of the last round (15), the word in output of the circuit XG12 and processed by the circuit EXP may only be masked by the parameter u. Accordingly, the processing performed by the circuit CC5 may be protected until the processing performed by the circuit XG12 at the end of the round 14. The word provided by the circuit EXP may be masked by the parameter E(u). At the output of the circuit XG11, the word may be masked by the parameter $E(u \oplus w)$ like in the other rounds. Thus, the processing performed by the circuit CC5 may again be protected. The word at the output of the circuit RPM may be masked by the parameter $v \oplus y$ and may further be masked by the parameter w by the circuit XG18. Since the word in the register RG1 is masked by the parameter $u \oplus w \oplus v \oplus y$, the word provided by the circuit XG12 may only be masked by the parameter u. Accordingly, the processing performed by the circuit CC5 is no more protected at the output of the circuit XG12 in the last round. The word provided to the circuit EXP and the multiplexer MX1 may only be masked by the parameter u. Before being processed by the final permutation circuit FPM, the masking by the parameter u may be removed by the circuit XG21 from the word provided by the multiplexer MX1 and removed by the circuit XG22 from the word provided by the circuit XG12 through the multiplexer MX3.

Figure 18:
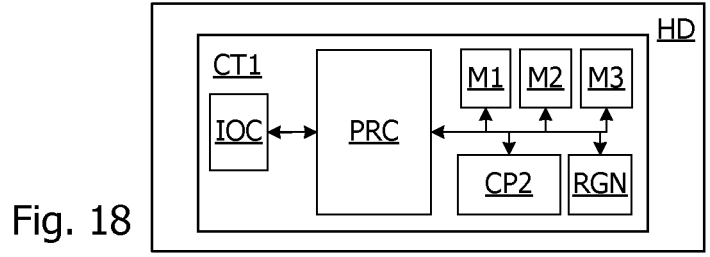
FIG. 18 illustrates a secure circuit, according to an example embodiment.

FIG. 18 illustrates an integrated circuit CT1 arranged on a portable medium HD such as, for example, a plastic card, and implementing one of the protection methods previously described, according to an example embodiment. The integrated circuit CT1 may include the same units as the integrated circuit CT described above in connection with FIG. 1, and differs from the latter in that the co-processor CP1 is replaced with a co-processor CP2 implementing one and/or the other protection methods described above. Therefore, according to an example embodiment, the co-processor CP2 may be configured to implement one of the circuit of FIGS. 5, 6, 13, 14 and 17, either by software or by hardware or a combination thereof.

The co-processor CP2 may also be configured to execute a part of the cryptographic operation. In this case, the processor PRC may be configured to produce output tables of resulting data including the result of the cryptographic operation. Each output table may be such that all data in the output table may have a same probability of occurrence.

In some implementations, the masked substitution table can be computed once optionally by another processing unit and stored in a read-only memory M3 of the circuit CT1. Therefore, the operations for generating the mask parameters u, v, w, y, z, . . . and the operations for generating the masked substitution tables SB1, SB2, SB3 and the masked round key tables KT1, KT2, KT2' and KT3 may not be necessarily implemented in the circuit CT1. The initialization steps S30 to S32, S50 to S52, S70 to S72, S93 to S95, or S120 to S122 can be performed once possibly by another processing unit and the resultant substitution tables SB1, SB2 SB3, and the resultant masked round key tables KT1, KT2, KT2' and KT3 stored in the non-volatile memory M3 at the time the circuit CT1 is manufactured. Step S32 or S35, S52 or S55, S72 or S75, S95, and S122 can then be executed by the circuit without executing the previous steps S30 and S31, S50 and S51, S70 and S72, S93 and S94, or S120 and S121.

The methods disclosed herein may also be implemented by software programs executable by a computer system. Further, implementations may include distributed processing and parallel processing, especially for processing in parallel several or all data in the input data sets and/or for providing in parallel several or all data in the output data sets.

The illustrations described herein are intended to provide a general understanding of the structure of various embodiments. These illustrations are not intended to serve as a complete description of all of the elements and features of apparatus, processors and systems that utilizes the structures or methods described therein. Many other embodiments may be apparent to those of ordinary skills in the art upon reviewing the disclosure by combining the disclosed embodiments. Other embodiments may be utilized and derived from the disclosure, such that structural and logical substitutions and changes may be made without departing from the scope of the disclosure.

Further, the disclosure and the illustrations are to be considered as illustrative rather than restrictive, and the appended claims are intended to cover all such modifications, enhancements and other embodiments, which fall within the true spirit and scope of the description. Thus, the scope of the following claims is to be determined by the broadest permissible interpretation of the claims and their equivalents, and shall not be restricted or limited by the foregoing description.

What is claimed is:

1. A method for protecting execution, by a circuit, of a substitution operation in which an output data is selected in an original substitution table, the substitution operation being included in an cryptographic operation for encrypting or decrypting an input data, the input data of the substitution operation being based on the input data of the cryptographic operation, the method comprising:
generating, by the circuit, a new masked substitution table obtained from the original substitution table to perform the substitution operation, the input data being combined by Exclusive OR (XOR) operations with a new value of a first mask parameter to obtain a masked input data, and the output data being combined by the XOR operations with a new value of a second mask parameter to obtain a masked output data, the generating the new masked substitution table comprising:
selecting, by the circuit, a first input mask and a second input mask;
computing, by the circuit, the new value of the first mask parameter by applying the XOR operations to a previous value of the first mask parameter and to the first input mask;
computing, by the circuit, the new value of the second mask parameter by applying the XOR operations to a previous value of the second mask parameter and to the second input mask;
selecting, by the circuit, each value in a previous masked substitution table obtained from the original substitution table; and
for each selected value:
computing, by the circuit, a masked value by applying the XOR operations to the selected value and to the second input mask,
computing, by the circuit, a masked index by applying the XOR operations to the first mask and to an original index, and
storing, by the circuit in a memory, the masked value in the new masked substitution table, the selected value being selected at the original index and the masked value being stored at the masked index, or the selected value being selected at the masked index and the masked value being stored at the original index.

2. The method of claim 1, wherein the generating the new masked substitution table comprises:
selecting, by the circuit, a third input mask for each of ranks from 1 to n, n being an integer number greater than one;
for each rank j from 1 to n−1, computing, by the circuit, a new value of a third mask parameter of rank j by applying the XOR operations to a previous value of the third mask parameter of rank j and to the input mask of ranks j and j+1; and
computing, by the circuit, a new value of the third mask parameter of rank n by applying the XOR operations to a previous value of the third mask parameter of rank n and to the third input mask of rank n, the new value of the first mask parameter being computed by applying the XOR operations to the previous value of the first mask parameter, to the third input mask of rank 1 and to the first input mask, the new value of the second mask parameter being computed by applying the XOR operations to the previous value of the second mask parameter, to the third input mask of rank 1 and to the second input mask, the substitution operation including applying the XOR operations to the masked input data and to each of the third mask parameters of ranks 1 to n, the masked output data corresponding to the output data of the substitution operation, combined by the XOR operations with the second mask parameter and with each of the third mask parameters of ranks 1 to n.

3. The method of claim 1, wherein the generating the new masked substitution table comprises:
selecting, by the circuit, a third input mask and a fourth input mask, of ranks 1 to n, n being an integer number greater than one;
for each rank j from 1 to n−1, computing, by the circuit, a new value of a third mask parameter of rank j by applying the XOR operations to a previous value of the third mask parameter of rank j and to the third input masks of ranks j and j+1, and computing a new value of a fourth mask parameter of rank j by applying the XOR operations to a previous value of the fourth mask parameter of rank j and to the fourth input masks of ranks j and j+1;
computing, by the circuit, a new value of the third mask parameter of rank n by applying the XOR operations to a previous value of the third mask parameter of rank n and to the third input mask of rank n;
computing, by the circuit, a new value of a fourth mask parameter of rank n by applying the XOR operations to a previous value of the fourth mask parameter of rank n and to the fourth input mask of rank n; and
computing, by the circuit, the new value of the first mask parameter by applying the XOR operations to the previous value of the first mask parameter, to the first input mask of rank 1 and to the first input mask, the new value of the second mask parameter being obtained by applying the XOR operations to the previous value of the second mask parameter, to the second input mask of rank 1 and to the second input mask, the substitution operation including applying the XOR operations to the masked input data and to the each of the first mask parameter of ranks 1 to n, the masked output data corresponding to the output data of the substitution operation, combined by the XOR operations with the second mask parameter and with each of the second mask parameters of ranks 1 to n.

4. The method of claim 1, further comprising randomly selecting, by the circuit, the first and second input masks.

5. The method of claim 1, wherein the data in the new masked substitution table are computed by the circuit in a random order.

6. The method of claim 1, wherein the substitution operation is included in an operation for encrypting or decrypting an input data according to a cryptographic algorithm.

7. The method of claim 6, wherein the cryptographic algorithm conforms with an Advanced Encryption Standard (AES), the method further comprising:
computing, by the circuit, a masked input data by applying the XOR operations to the input data and to the new value of the first mask parameter;
computing, by the circuit, a first masked round input data by applying the XOR operations to the masked input data and to a first round key;

performing rounds, each round including:
    performing, by the circuit, the substitution operation applied to a previously computed masked round input data and using the new masked substitution table,
    computing, by the circuit, a masked round input data by applying the XOR operations to an output data of an AES column-based permutation operation, to a corresponding round key, and to the new value of the first mask parameter and to the new value of the second mask parameter; and
performing a last round including:
    computing, by the circuit, a substitution output data by performing the substitution operation using the new masked substitution table, receiving as input a previously computed masked round input data, and
    computing, by the circuit, a masked output data by applying the XOR operations to the substitution output data and to a corresponding round key, an output data resulting from processing the input data by the cryptographic algorithm being obtained by applying the XOR operations to the masked output data and to the new value of the second mask parameter.

8. The method of claim 7, wherein each of the rounds use a respective masked round key, the method further comprising:
    selecting, by the circuit, a third input mask, and
    computing, by the circuit, a new value of a third mask parameter by applying the XOR operations to a previous value of the third mask parameter and to the third input mask, the new value of the first mask parameter being computed by applying the XOR operations to the previous value of the first mask parameter, to the third input mask and the first input mask, the new value of the second mask parameter being computed by applying the XOR operations to the previous value of the second mask parameter, to the third input mask and the second input mask, new masked round keys being each obtained by applying the XOR operations to the new value of the third mask parameter and to a previous round key, the new masked substitution table being generated by using the new value of the first mask parameter and the new value of the second mask parameter,
    the substitution operation being performed by the circuit by applying the XOR operations to the masked input data and to the new value of the third mask parameter, the masked output data corresponding to the output data of the substitution operation, combined by the XOR operations with the second mask parameter and with the new value of the third mask parameter.

9. The method of claim 6, wherein the cryptographic algorithm conforms with a Data Encryption Standard (DES), the method further comprising:
    performing rounds, each round including:
        computing, by the circuit, a masked round data by applying the XOR operations to an output data of a DES expansion operation and to the new value of the first mask parameter;
        performing, by the circuit, a substitution operation from the masked round data using new masked substitution tables, the substitution operation providing a masked substitution output data masked by the new value of the second mask parameter, and
        computing, by the circuit, an unmasked substitution output data by applying the XOR operations to the masked substitution output data and to the new value of the second parameter.

10. The method of claim 9, wherein the generating the new masked substitution table comprises:
    selecting, by the circuit, a third input mask and a fourth input mask;
    computing, by the circuit, a new value of a third mask parameter by applying the XOR operations to a previous value of the third mask parameter and to the third input mask, the new value of the first mask parameter being computed by applying the XOR operations to previous value of the first mask parameter and to the third input mask and the first input mask;
    computing, by the circuit, new values of a fourth mask parameter by applying the XOR operations to a previous value of the fourth mask parameter and to the fourth input mask, the new value of the second mask parameter being computed by applying the XOR operations to the previous value of the second mask parameter and to the fourth input mask and the second input mask;
    computing, by the circuit, a transformed first input mask by applying the DES expansion operation to the first input mask; and
    computing, by the circuit, a transformed second input mask by applying a reverse DES permutation operation to the second input mask, the new masked substitution table being generated using as the first and second input masks the transformed first input mask and the transformed second input mask,
    the method further including computing, by the circuit, masked round keys by applying the XOR operations to DES round keys and to transformed third and fourth input masks obtained by applying the DES expansion operation to third and fourth input masks, and using the new value of the third mask parameter and the new value of the fourth mask parameter.

11. A circuit, comprising:
    a memory and a processor configured to:
    execute a substitution operation in which an output data is selected in an original substitution table, the substitution operation being included in an cryptographic operation for encrypting or decrypting an input data, the input data of the substitution operation being based on the input data of the cryptographic operation, the substitution operation being performed using a new masked substitution table obtained from the original substitution table, the input data being combined by Exclusive OR (XOR) operations with a new value of a first mask parameter, and the output data being combined by the XOR operations with a new value of a second mask parameter,
    generate the new masked substitution table from a previous masked substitution table by:
    selecting a first input mask and a second input mask;
    computing the new value of the first mask parameter by applying the XOR operations to a previous value of the first mask parameter and to the first input mask;
    computing the new value of the second mask parameter by applying XOR operations to a previous value of the second mask parameter and to the second input mask;
    selecting each value in the previous masked substitution table obtained from the original substitution table; and
    for each selected value:

computing a masked value by applying the XOR operations to the selected value and to the second input mask,
computing a masked index by applying the XOR operations to the first mask and to an original index, and
storing in the memory the masked value in the new masked substitution table, the selected value being selected at the original index and the masked value being stored at the masked index, or the selected value being selected at the masked index and the masked value being stored at the original index.

12. The circuit of claim 11, wherein the circuit is configured to generate the new masked substitution table by:
selecting a third input mask for each of ranks from 1 to n, n being an integer number greater than one;
for each rank j from 1 to n−1, computing a new value of a third mask parameter of rank j by applying the XOR operations to a previous value of the third mask parameter of rank j and to the input mask of ranks j and j+1; and
computing a new value of the third mask parameter of rank n by applying the XOR operations to a previous value of the third mask parameter of rank n and to the third input mask of rank n, the new value of the first mask parameter being computed by applying the XOR operations to the previous value of the first mask parameter, to the input mask of rank 1 and to the first input mask, the new value of the second mask parameter being computed by applying the XOR operations to the previous value of the second mask parameter, to the input mask of rank 1 and to the second input mask, the processor being configured to perform the substitution operation by applying the XOR operations to the masked input data and to each of the mask parameters of ranks 1 to n, the masked output data corresponding to the output data of the substitution operation, combined by the XOR operations with the second mask parameter and with each of the mask parameters of ranks 1 to n.

13. The circuit of claim 11, wherein the circuit is configured to generate the new masked substitution table by:
selecting a third input mask and a fourth input mask, of ranks 1 to n, n being an integer number greater than one;
for each rank j from 1 to n−1, computing a new value of a third mask parameter of rank j by applying the XOR operations to a previous value of the third mask parameter of rank j and to a the third input masks of ranks j and j+1, and computing a new value of a fourth mask parameter of rank j by applying the XOR operations to a previous value of the fourth mask parameter of rank j and to the fourth input masks of ranks j and j+1;
computing a new value of the third mask parameter of rank n by applying the XOR operations to a previous value of the third mask parameter of rank n and to the third input mask of rank n;
computing a new value of the fourth mask parameter of rank n by applying the XOR operations to a previous value of the fourth mask parameter of rank n and to the fourth input mask of rank n; and
the new value of the first mask parameter being obtained by applying the XOR operations to the previous value of the first mask parameter, to the first input mask of rank 1 and to the first input mask, the new value of the second mask parameter being obtained by applying the XOR operations to the previous value of the second mask parameter, to the second input mask of rank 1 and to the second input mask, the substitution operation including applying the XOR operations to the masked input data and to the each of the first mask parameter of ranks 1 to n, the masked output data corresponding to the output data of the substitution operation, combined by the XOR operations with the second mask parameter and with each of the second mask parameters of ranks 1 to n.

14. The circuit of claim 11, wherein the circuit is configured to randomly select the first and second input masks.

15. The circuit of claim 11, wherein the circuit is configured to compute in a random order the data in the new masked substitution table.

16. The circuit of claim 11, wherein the substitution operation is included in an operation for encrypting or decrypting an input data according to a cryptographic algorithm, the circuit being configured to perform the encrypting or decrypting operation.

17. The circuit of claim 16, wherein the cryptographic algorithm conforms with an Advanced Encryption Standard (AES), the circuit further configured to:
compute a masked input data by applying the XOR operations to the input data and to the new value of the first mask parameter;
compute a first masked round input data by applying the XOR operations to the masked input data and to a first round key;
perform rounds, each round including:
perform the substitution operation applied to a previously computed masked round input data and using the new masked substitution table,
compute a masked round input data by applying the XOR operations to an output data of an AES column-based permutation operation, to a corresponding round key, and to the new value of the first mask parameter and to the new value of the second mask parameter; and
performing a last round including:
compute a substitution output data by performing the substitution operation using the new masked substitution table, receiving as input a previously computed masked round input data, and
compute a masked output data by applying the XOR operations to the substitution output data and to a corresponding round key, an output data resulting from processing the input data by the cryptographic algorithm being obtained by applying the XOR operations to the masked output data and to the new value of the second mask parameter.

18. The circuit of claim 17, wherein each of the rounds use a respective masked round key, the circuit further configured to:
select a third input mask, and
compute a new value of a third mask parameter by applying the XOR operations to a previous value of the third mask parameter and to the third input mask, the new value of the first mask parameter being computed by applying the XOR operations to the previous value of the first mask parameter, to the third input mask and the first input mask, the new value of the second mask parameter being computed by applying the XOR operations to the previous value of the second mask parameter, to the third input mask and the second input mask, new masked round keys being each obtained by applying the XOR operations to the new value of the third mask parameter and to a previous round key, the new masked substitution table being generated by using the new value of the first mask parameter and the new value of the second mask parameter, the substitution operation includes applying the XOR operations to the masked input data and to the new value of the third mask parameter, the masked output data corresponding to the output data of the substitution operation, combined by the XOR operations with the second mask parameter and with the new value of the third mask parameter.

19. The circuit of claim 16, wherein the cryptographic algorithm conforms with a Data Encryption Standard (DES), the circuit configured to:

perform rounds, each round including:
compute a masked round data by applying the XOR operations to an output data of a DES expansion operation and to the new value of the first mask parameter;
perform a substitution operation from the masked round data using new masked substitution tables, the substitution operation providing a masked substitution output data masked by the new value of the second mask parameter, and
compute an unmasked substitution output data by applying the XOR operations to the masked substitution output data and to the new value of the second parameter.

20. The circuit of claim 19, wherein the circuit is configured to generate the new masked substitution table from the previous masked substitution table by:

selecting a third input mask and a fourth input mask;
computing a new value of a third mask parameter by applying the XOR operations to a previous value of the third mask parameter and to the third input mask, the new value of the first mask parameter being computed by applying the XOR operations to previous value of the first mask parameter and to the third input mask and the first input mask;
computing new values of a fourth mask parameter by applying the XOR operations to a previous value of the fourth mask parameter and to the fourth input mask, the new value of the second mask parameter being computed by applying the XOR operations to the previous value of the second mask parameter and to the fourth input mask and the second input mask;
computing a transformed first input mask by applying the DES expansion operation to the first input mask; and
computing a transformed second input mask by applying a reverse DES permutation operation to the second input mask, the new masked substitution table being generated using as the first and second input masks the transformed first input mask and the transformed second input mask, the circuit further configured to use masked round keys obtained by applying the XOR operations to DES round keys and to transformed third and fourth input masks obtained by applying the DES expansion operation to third and fourth input masks, and using the new value of third mask parameter and the new value of the fourth mask parameter.

21. The circuit of claim 11, further comprising a coprocessor.

22. A device comprising a circuit according to claim 11, arranged on a medium.

23. A non-transitory computer readable medium carrying one or more sequences of instructions, which when executed by one or more processors, cause the one or more processors to:

execute a substitution operation in which an output data is selected in an original substitution table, the substitution operation being included in an cryptographic operation for encrypting or decrypting an input data, the input data of the substitution operation being based on the input data of the cryptographic operation, the substitution operation being performed using a new masked substitution table obtained from the original substitution table to perform the substitution operation, the input data being combined by Exclusive OR (XOR) operations with a new value of a first mask parameter, and the output data being combined by the XOR operations with a new value of a second mask parameter, the new masked substitution table being obtained from a previous masked substitution table by:

selecting a first input mask and a second input mask;
computing the new value of the first mask parameter by applying the XOR operations to a previous value of the first mask parameter and to the first input mask;
computing the new value of the second mask parameter by applying the XOR operations to a previous value of the second mask parameter and to the second input mask;
selecting each value in the previous masked substitution table obtained from the original substitution table; and
for each selected value:
computing a masked value by applying the XOR operations to the selected new value and to the second input mask,
computing a masked index by applying the XOR operations to the first mask and to an original index, and
storing the masked value in the new masked substitution table, the selected value being selected at the original index and the masked value being stored at the masked index, or the selected value being selected at the masked index and the masked value being stored at the original index.

* * * * *